(12) United States Patent
Ray et al.

(10) Patent No.: US 11,834,317 B2
(45) Date of Patent: *Dec. 5, 2023

(54) APPARATUS, SYSTEM AND METHOD FOR FILLING A BEVERAGE CONTAINER

(71) Applicant: CRAFT STANDARD ENTERPRISES, INC., Fayetteville, AR (US)

(72) Inventors: William Ray, Fayetteville, AR (US); Don Ray, Fayetteville, AR (US); Benjamin Simon, Dallas, TX (US)

(73) Assignee: CRAFT STANDARD ENTERPRISES, INC., Fayetteville, AR (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/365,833

(22) Filed: Jul. 1, 2021

(65) Prior Publication Data

US 2022/0002132 A1 Jan. 6, 2022

Related U.S. Application Data

(63) Continuation-in-part of application No. 17/301,458, filed on Apr. 2, 2021.

(Continued)

(51) Int. Cl.
  *B67C 3/34* (2006.01)
  *B67D 1/08* (2006.01)
  (Continued)

(52) U.S. Cl.
  CPC .............. *B67C 3/34* (2013.01); *B67D 1/0805* (2013.01); *B67D 1/0831* (2013.01);
  (Continued)

(58) Field of Classification Search
  CPC .. C12G 3/04; B67C 3/34; B67C 11/02; B67C 2011/30; B67D 1/0831; B67D 1/0848; B67D 1/1277; B67D 1/1405
  See application file for complete search history.

(56) References Cited

U.S. PATENT DOCUMENTS

| 194,508 A | * | 8/1877 | Aenis | B67D 1/0832 137/212 |
| 2,539,349 A | * | 1/1951 | Giles | B67D 1/0832 222/400.7 |

(Continued)

FOREIGN PATENT DOCUMENTS

| GB | 606173 A | 8/1948 |
| GB | 998004 A | 7/1965 |

(Continued)

OTHER PUBLICATIONS

PCT International Searching Authority, PCT Invitation to Pay Additional Fees and, Where Applicable, Protest Fee, International Application No. PCT/US21/70354, dated Jun. 2, 2021, pp. 1-3.

(Continued)

*Primary Examiner* — Nicolas A Arnett
(74) *Attorney, Agent, or Firm* — Hoffman Warnick LLC

(57) ABSTRACT

Exemplary embodiments include a filling apparatus that can be connected to a valve on a keg, such as a Sankey-D valve, and can be used to pour alcohol and other liquids into the keg, which may be pre-filled with a non-alcoholic drink mix. The filling apparatus has an upper structure coupled to a valve assembly which is coupled to a lower structure configured to mate with a keg valve. The filling apparatus may be designed to depress portions of the keg valve to allow for both filling and venting of the keg simultaneously. The filling apparatus may include a Sankey-D coupler or a coupler with a probe portion as the lower body portion.

14 Claims, 22 Drawing Sheets

Related U.S. Application Data

(60) Provisional application No. 63/201,009, filed on Apr. 8, 2021, provisional application No. 63/047,237, filed on Jul. 1, 2020.

(51) Int. Cl.
  *B67D 1/14* (2006.01)
  *B67D 1/12* (2006.01)
  *C12G 3/00* (2019.01)
  *B67C 11/00* (2006.01)

(52) U.S. Cl.
  CPC ......... *B67D 1/0848* (2013.01); *B67D 1/1277* (2013.01); *B67D 1/1405* (2013.01); *B67C 2011/30* (2013.01); *B67D 2001/0822* (2013.01); *C12G 3/00* (2013.01)

(56) References Cited

U.S. PATENT DOCUMENTS

| | | | | | |
|---|---|---|---|---|---|
| 3,231,154 | A * | 1/1966 | Johnston | ............ | B67D 1/0832 222/400.7 |
| 3,357,602 | A * | 12/1967 | Sichler | ............ | B67D 1/0832 137/853 |
| 3,439,844 | A * | 4/1969 | Johnston | ............ | B67D 1/0832 222/400.7 |
| 3,712,514 | A * | 1/1973 | LeBlanc | ............ | F25D 31/006 222/626 |
| 4,494,585 | A * | 1/1985 | Waldecker | ............ | B67C 11/00 141/297 |
| 4,717,048 | A * | 1/1988 | Stenger | ............ | B67D 1/0832 137/320 |
| 4,728,010 | A * | 3/1988 | Johnston | ............ | B67D 1/0832 137/212 |
| 9,828,227 | B2 * | 11/2017 | Dalton | ............ | G05D 16/08 |
| 11,511,986 | B2 * | 11/2022 | Ray | ............ | B67D 7/0294 |
| 11,518,668 | B2 * | 12/2022 | Caputo | ............ | B67D 1/0841 |
| 2005/0279777 | A1 * | 12/2005 | Taguchi | ............ | B67C 3/34 222/399 |
| 2006/0118574 | A1 * | 6/2006 | Anderson | ............ | B67C 3/30 222/1 |
| 2007/0169834 | A1 * | 7/2007 | Monzel | ............ | B67C 3/34 141/18 |
| 2015/0291407 | A1 * | 10/2015 | Fox | ............ | B67C 11/02 141/339 |
| 2016/0152463 | A1 * | 6/2016 | Ware | ............ | B67D 7/0261 222/1 |
| 2017/0088408 | A1 * | 3/2017 | Fickert | ............ | B67C 3/34 |
| 2022/0002132 | A1 * | 1/2022 | Ray | ............ | B67D 1/0805 |
| 2022/0002138 | A1 * | 1/2022 | Ray | ............ | B67D 1/0831 |
| 2022/0002141 | A1 * | 1/2022 | Ray | ............ | B67C 3/34 |
| 2022/0055880 | A1 * | 2/2022 | Ray | ............ | C12G 3/04 |

FOREIGN PATENT DOCUMENTS

| | | |
|---|---|---|
| GB | 1115223 A | 5/1968 |
| WO | 2019110218 A1 | 6/2019 |

OTHER PUBLICATIONS

Notification of Transmittal of the International Search Report and the Written Opinion of the International Searching Authority, or the Declaration issued to International Application No. PCT/US21/70354 dated Sep. 14, 2021, 13 pages.

PCT International Search Report and Written Opinion for International Application No. PCT/US21/59870, dated Mar. 24, 2022, 16 pages.

PCT International Search Report and Written Opinion for International Application No. PCT/US21/48251, dated Dec. 10, 2021, 13 pages.

'Instructional Video %E2%80%93 For Margarita, Mule, Paloma, and Mojito _v2' (Benjamin Simon) Jan. 27, 2021 (Jan. 27, 2021) [online] retrieved from <URL: https://vimeo.com/505378455> entire document.

'D System Keg Valve ' (Micro Matic) May 7, 2019 (May 7, 2019) [online] retrieved from <URL:https://www.califomiacraftbeer.com/wp-content Vuploads/2019/05/D-System-Keg-Valves-Safety-and-Quality-Assurance-for-your-Draft-Beer.pdf> entire document, especially p. 6, 13, 15.

'Performance Guide lines For Refillable Kegs' (Brewers Association) Mar. 19, 2014 (Mar. 19, 2014)[online] retrieved from <URL:https://www.brewersassociallon.org/attachments/0001/4565/Performance_Guide lines_for_Re filla ble_ Kegs . pdf> entire document, especially p. 9.

Notification of Transmittal of the International Search Report (Form PCT/ISA/220) and the Written Opinion of the International Searching Authority (Form PCT/ISA/237), or the Declaration, issued from the International Searching Authority to International Application No. PCT/US21/40186, dated Dec. 6, 2021, 20 pages.

Westby, G., Negroni in Barrel, YouTube.com, Jun. 4, 2013, https://www.youtube.com/watch?v=16PDYtZ7YoU, 1 page.

Man Skirt Brewing, Filling kegs with Hard Seltzer at Man Skirt Brewing, YouTube.com, May 10, 2020, https://www.youtube.com/watch?v=ROfH5nUvUzk, 1 page.

PCT International Preliminary Report on Patentability for International Application No. PCT/US21/70354, dated Jan. 12, 2023, 10 pages.

* cited by examiner

APPARATUS, SYSTEM AND METHOD FOR FILLING A BEVERAGE CONTAINER

CROSS-REFERENCE TO RELATED APPLICATIONS

This application claims priority to U.S. Application No. 63/047,237, filed Jul. 1, 2020, entitled "Keg Spiker" and U.S. Application No. 63/201,009, filed Apr. 8, 2021, entitled "Apparatus, System and Method for Filling a Beverage Container." This application also claims priority to and is a continuation-in-part of U.S. application Ser. No. 17/301,458, filed Apr. 2, 2021, entitled "Apparatus, System and Method for Filling a Beverage Container," which claims priority U.S. Application No. 63/047,237, filed Jul. 1, 2020, entitled "Keg Spiker." The contents of these priority applications are hereby incorporated by reference in their entirety.

FIELD OF THE INVENTION

The present invention relates generally to an apparatus, system and process for filling a beverage container, and more particularly to system and method for filling a keg with liquid using an apparatus that connects to a conventional keg valve.

BACKGROUND

Bars, restaurants and other establishments that serve alcoholic beverages commonly have serving equipment that includes refrigerators, couplers, regulators, lines and taps for beer kegs. Often, a bar will offer a large selection of beers, each with its own line and customized tap. One of the most common configurations includes a Sankey-D coupler, which is a widely used coupling device in bars and restaurants for beer kegs.

Although this equipment has provided high efficiencies in serving beer, the same is not true for mixed drinks. Alcoholic beverage laws prohibit the sale of spirits in containers larger than 1.75 liters; hence there are no kegs or taps for mixed drinks. At the same time, the preparation of mixed drinks requires skill and experience to know the various constituents of the mixed drink, the relative quantities, and to consistently mix the drink in the right proportions, often in a crowded, busy environment. These factors result in significant losses, inefficiencies and decreased quality arising from inconsistent and inaccurate mixing by bartenders of different skill levels as well as the time it takes even a skilled bartender to combine all the constituents of the mixed drink.

In addition to the prohibition on selling spirits in containers larger than 1.75 liters, there is an additional challenge that has prevented the use of kegs to serve mixed drinks on tap. Kegs are generally filled with a keg filling device that uses an industrial, pressurized system to fill the keg. Conventional keg filling devices require large, high volume tanks and pressure to fill the keg through a coupling device such as a Sankey-D coupler. For example, an industrial filling equipment uses a filling Sankey with a larger internal opening to allow liquid to flow faster when filling than a normal Sankey used for dispensing. These conventional keg filling devices further typically take a large amount of space and fill the keg through a liquid dispensing tube of the coupler. Setting up such conventional keg filling devices requires large spaces and an investment in heavy equipment to install tanks. Further, the conventional keg filling devices cannot be transported without large trucks and cannot be used without large tanks and pressure. Hence, there is no easy way to fill kegs without the use of large, heavy, expensive equipment.

These and other drawbacks have greatly inhibited the efficient serving of mixed drinks at bars, restaurants and other establishments.

SUMMARY

According to an embodiment, an apparatus, system, and method is provided that enables bars, restaurants, and other establishments to serve mixed drinks and craft cocktails on draft using a standard beer keg system, such as a Sankey (or Sanke) keg and related Sankey coupler, lines, and taps. The Sankey keg may include the Sankey-D valve, for example, or other Sankey valves, such as Sankey S, A, G, U, or M type systems. Exemplary embodiments may use a Sankey-D valve as an example; however, this is meant to be non-limiting.

According to one example, a keg having a Sankey-D valve is partially filled with a non-alcoholic, liquid cocktail mix. The keg may be of any type, such as a rubber barrel, beveled barrel, half barrel, slim quarter, quarter barrel, Cornelius keg, and sixth barrel. It should be appreciated that the amount of liquid (e.g., mix and alcohol) will be adjusted based on the keg size. Since the mix is non-alcoholic, there is no prohibition on the use of a keg, such as a standard, 30-liter Sankey-D type keg. In one particular embodiment, a 30-liter keg is partially filled with 21 liters of liquid cocktail mix (e.g., margarita mix). The keg is then shipped to a bar, restaurant or other establishment that serves alcoholic drinks. A keg filling apparatus, which will be described in detail below, is also provided to the bar, restaurant or other establishment. The bartender installs the keg-filling apparatus on the keg valve, degasses the keg, and pours alcohol into the keg via the keg-filling apparatus. The keg-filling apparatus allows the keg to be filled with the alcohol using only gravity, rather than a large, pressurized industrial filling system. Once the specified amounts and types of alcohol (e.g., 9 liters total of one or more spirits) have been poured into the keg and mixed with the cocktail mix, the keg filling apparatus is removed, the contents in the keg are mixed and the keg is ready to be installed in the Sankey-D tap system, just like a beer keg.

Another embodiment includes an apparatus for filling a container (e.g., a keg) with liquid, wherein the container includes a valve that seals the container and a locking recess to receive the filling apparatus. The valve may include multiple parts such as a ball valve and a venting valve that surrounds the ball valve. The filling apparatus may comprise an upper hollow body (e.g., in the shape of a funnel) having a top opening and a bottom opening, the top opening enabling a liquid to be poured into the top opening. The filling apparatus may also comprise a lower hollow body having a valve that is joined to a Sankey-D coupler. The lower hollow body may include a valve to block liquid flow from the funnel. Specifically, exemplary embodiments may use the Sankey-D coupler to open (e.g., depress) the ball valve and the ring valve. The ring valve allows for gas to escape or vent from the container. The ball valve allows for the addition of liquid (e.g., alcohol) to be added to the container. The filling apparatus valve may be used to stop liquid flow into the container and block liquid from being vented upward through the funnel when the keg is pressurized (i.e., prior to degassing).

According to another embodiment, an apparatus for filling a container (e.g., a keg) with liquid is provided, wherein the container includes a valve that seals the container and a locking recess to receive the filling apparatus. The valve may include multiple parts such as a ball valve and a venting valve that surrounds the ball valve. The filling apparatus may comprise an upper hollow body (e.g., in the shape of a funnel) having a top opening and a bottom opening, the top opening enabling a liquid to be poured into the top opening. The filling apparatus may also comprise a lower hollow body joined to a lower end of the upper hollow body. The lower hollow body may include a valve to block liquid flow from the funnel, a locking ring that locks configured to mate with the container and lock the apparatus into place, a probe that engages with the valve of the container to open the parts of the valve, and a vent pathway for gas. Specifically, exemplary embodiments may open (e.g., depress) the ball valve and the ring valve. The ring valve allows for gas to escape or vent from the container. The ball valve allows for the addition of liquid (e.g., alcohol) to be added to the container. The filling apparatus valve may be used to stop liquid flow into the container and block liquid from being vented upward through the funnel when the keg is pressurized (i.e., prior to degassing).

According to another embodiment, an apparatus for filling a keg with liquid is provided, the keg comprising a valve that seals the container and a locking recess to receive the apparatus, the apparatus including an upper hollow body having a top opening and a bottom opening and tapering from the top opening to the bottom opening, the top opening enabling a liquid to be poured into the top opening and subsequently flow downward, by gravity, to exit the bottom opening; a lower body, joined to the upper hollow body, having a coupling ring, a valve assembly and a probe assembly; the coupling ring configured to engage with the locking recess on the keg; the valve assembly comprising a cylindrical structure having a ball valve located therein, the ball valve comprising an open and a closed position that regulate liquid flow therethrough; the probe assembly configured to engage with the valve when the coupling ring is engaged and comprising a first portion to depress a liquid ball valve portion of the valve and a second portion to depress a ring valve portion of the valve, wherein depressing the liquid ball valve allows for liquid flow from the apparatus into the container when the ball valve is in the open position and wherein depressing the ring valve allows for venting of gas from the keg due to displacement by the liquid flow, the second portion comprising a plurality of gas venting pathways to the atmosphere.

According to another embodiment, the invention relates to a method for distributing mixed drinks. The method may comprise providing a keg containing a non-alcoholic mix of liquids, wherein the mix is designed to be converted to a mixed drink by addition of alcohol, the quantity of mix in the keg is predetermined to allow for the addition of a predetermined quantity of the alcohol into the keg to complete the mixed drink; and the keg includes a valve such as a Sankey-D valve that is designed to connect to a coupler used to dispense beverages from the keg.

According to another embodiment, the invention relates to a method for preparing mixed drinks. The method may comprise receiving a keg containing a non-alcoholic mix of liquids, wherein (a) the mix is designed to be converted to a mixed drink by addition of alcohol; (b) the quantity of the mix in the keg is predetermined to allow for the addition of a predetermined quantity of the alcohol into the keg to complete the mixed drink; and (c) the keg comprises a valve, e.g., a Sankey-D valve, designed to be connected to a coupler through which the mixed drink is dispensed. The method may also comprise using an apparatus to pour the alcohol into the keg. The method may also comprise mixing the mix with the alcohol to complete the mixed drink in the keg; connecting the keg to a coupler; and dispensing the mixed drink through a tap connected to the coupler.

Exemplary embodiments of the invention can provide a solution that significantly reduces the time needed to make the most popular craft cocktails and mixed drinks, which, in turn, increases the number of craft cocktails and mixed drinks sold by the bar, restaurant, or other establishment. For alcoholic beverage distributors, increased throughput at bars, restaurants and other establishments results in an increase in the quantity of spirits sold. Furthermore, embodiments of the invention allow bars and restaurants that own standardized beer keg systems, such as the widely-used Sankey-D keg system, to use their existing equipment to serve craft cocktails and mixed-drinks on draft. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Various embodiments of the invention relate to a filling apparatus for a container such as a keg and related processes and systems for using the filling apparatus to add a liquid such as alcohol to the container. The apparatus may be configured to be a hand-held device designed to release air pressure in the keg and also enable filling the keg with additional liquid by gravity. Various embodiments of the invention can overcome the disadvantages described above.

Figure 1:
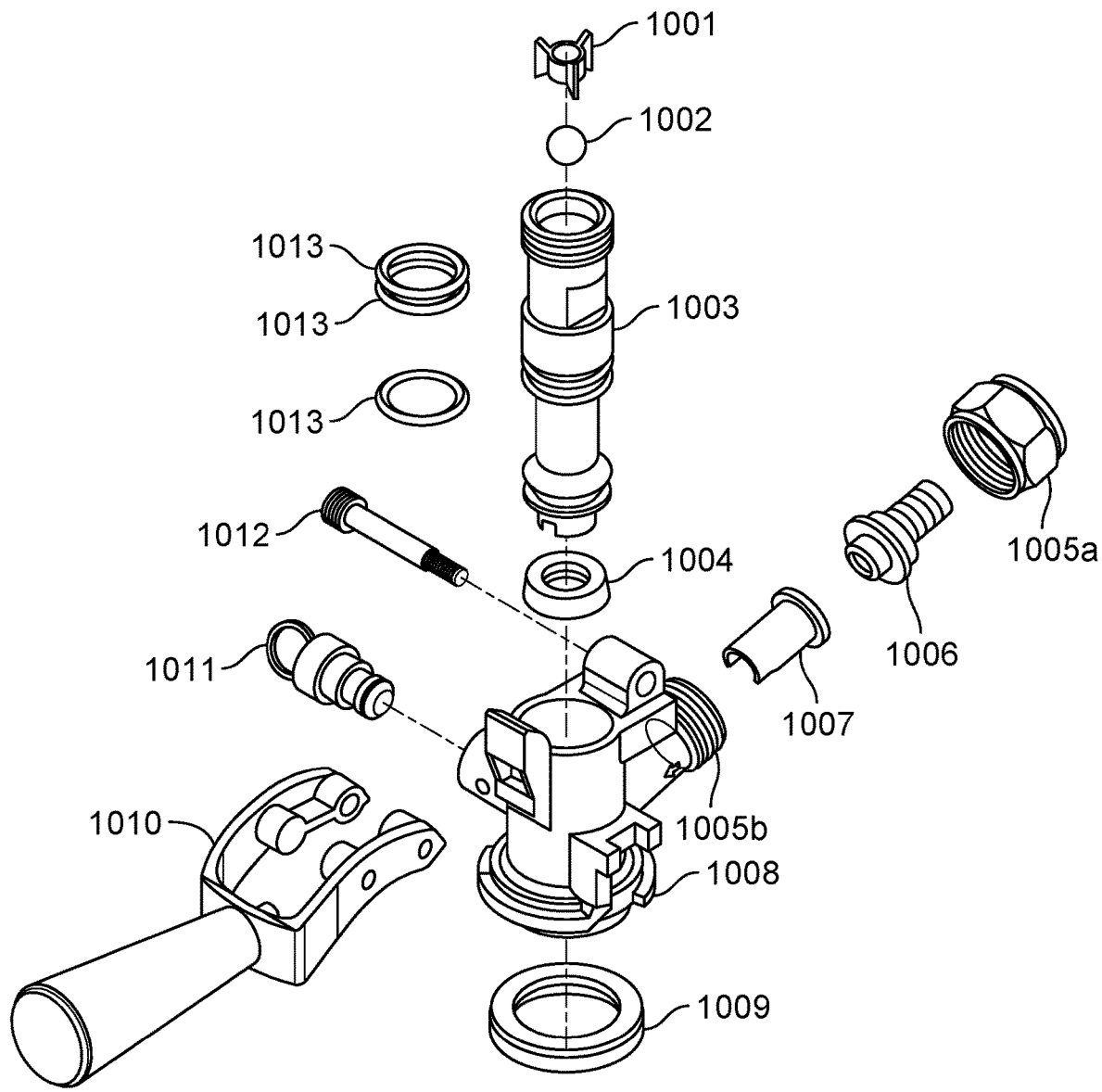
FIG. 1 illustrates an exemplary Sankey-D coupler (conventional art) that may be used in and with exemplary embodiments.

FIG. 1 illustrates an exemplary conventional Sankey-D coupler 1000 that may be used in exemplary embodiments. This coupler may be attached to a keg after filing the keg using the filling apparatus disclosed herein. The conventional Sankey-D coupler 1000 is used to dispense the mixed drink as conventionally done in a pressurized tap system. The conventional Sankey-D coupler 1000 may comprise a ball retainer 1001, a coupler ball 1002, a probe 1003, a probe seal 1004, a hex nut 1005a that mates with threaded portion 1005b, a tailpiece 1006 for coupler, a check valve 1007, a coupler body 1008, a bottom seal 1009, a handle assembly 1010, a pressure relief valve 1011, a handle hinge pin 1012, and an O-ring for coupler probe 1003. The coupler body 1008 is designed to mate with the complementary locking threads or teeth of the keg spear valve assembly. The Sankey-D coupler 1000 can be attached to the keg spear valve assembly by placing the coupler onto the valve assembly locking threads or teeth and twisting it to engage the coupler body 1008 with the keg spear valve assembly. Following such engagement, the handle assembly 1010 may be moved to a second position to engage the Sankey-D coupler 1000 probe 1003. The probe 1003 is moved downward within the coupler 1000 to depress the keg spear valve assembly (i.e., the ball valve and the ring valve that are attached to a tube or spear assembly). The Sankey-D coupler, such as that depicted in FIG. 1, once attached to the keg, can serve two functions: 1) it opens both the venting valve and the ball or beer valve simultaneously so that pressure can be added to the top of inside of the keg (using the probe), and 2) the liquid can be released from the keg through the ball valve once the tap is opened on the bar, in a restaurant, and/or at other event venues.

The keg may be designed to have a keg bung in which a valve (e.g., a valve having a ball valve (sometimes referred to as a beer valve) and a ring valve (sometimes referred to as a venting or CO2 valve)) is received. The keg bung may be externally threaded around its exterior circumference. The keg bung may located at the center portion on the upper surface of the keg. This valve may be referred to a Sankey-D valve. The valve may be secured to the keg by the threads surrounding the keg bung to allow for removal. The valve may include a tube that is integrally attached thereto. The tube may be referred to as a spear. The valve and spear may be removable as single piece on metal kegs. In some embodiments, the valve may be manufactured with the keg and be integral to the keg. For example, the valve (and spear) may be integral to PET kegs in a conventional arrangement.

The tube is designed to extend into the keg to allow for liquid flow in or out of the keg. For example, when liquid is added to the keg through the ball valve (e.g., beer valve), the liquid is directed downward through this tube and flows into the keg at the lower portion into the liquid volume in the keg, causing the liquid level in the keg to rise, which in turn displaces gas located above the liquid level. This gas may then exhaust through the venting valve (when it is open) and be directed out to the atmosphere outside of the keg volume. In a typical use of a keg, when liquid is being dispensed from the keg, the venting valve (e.g., CO2 valve) is opened to add pressure to the top of the liquid in the keg, so when the tap is opened at the bar, liquid can flow through the ball valve (also known as a beer valve) out of the keg.

FIGS. 2A, 2B, 2C, 2D, and 2E (collectively referred to as FIG. 2) show a device according to exemplary embodiments. The device 200 may have three primary parts. First, a Sankey-D coupler 202 is located at the lower end of the device. The Sankey-D coupler 202 may be the same as that shown in FIG. 1. Second, the upper portion of the device may include a funnel assembly 204. Third, a valve assembly 206 may be located between the funnel assembly 204 and the Sankey-D coupler 202. The valve assembly 206 may by cylindrical in construction and serve as the joining structure for the funnel assembly and Sankey-D coupler. The valve assembly may be constructed of metal, plastic, polymer, or any other semi-rigid or rigid material which is machinable, moldable, castable or formable with physical properties such that it is rigid and able to maintain its shape and be of sufficient strength and stiffness so as to allow it to functionally perform in the manner described herein.

The valve assembly 206 may have two positions: open and closed. In FIG. 2, the valve assembly 206 is in an open position. This position allows for a fluid path from the funnel through the Sankey-D coupler. The second position closes off that fluid path. The valve assembly 306 may rotate through 90 degrees between the open and closed positions. The valve assembly 206 may be a ball valve. Other types of valves may be used such as a butterfly valve.

The funnel assembly 204 may have an opening 208 at its upper portion and an outlet 210 at its lower portion. The opening 208 may be larger than the outlet 210. The opening 208 may be circular as shown. In various embodiments, the opening 208 may have other shapes, such as polygonal. The funnel assembly 204 may vertically taper down from the opening 208 to the outlet 210. The outlet 210 may be cylindrical and join with the valve assembly 206 at cylindrical portion 212. The valve assembly 206 may join with the Sankey-D coupler 202 at 214 as shown in FIG. 2.

The funnel assembly 204 may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein. The funnel assembly may be of various sizes according to exemplary embodiments. For example, the funnel assembly may be sized to accommodate up one liter of fluid. In other embodiments, the funnel assembly may be of different sizes. For example, funnel assembly may be sufficiently large (e.g., about 5.5 inches wide by about 4.25 inches high) to accommodate a reasonable amount of fluid for flow into the keg to allow for filling of the keg in a minimum of time.

The funnel assembly 204 may be joined to the Sankey-D coupler 202 through the valve assembly 206. In exemplary embodiments, the funnel assembly 204 and the valve assembly 206 may be molded directly onto the Sankey-D coupler 202. Others methods of joining may be used such as threading, welding, gluing, soldering, machining, carving, 3D printing, and so forth. As used herein the term "coupled" is not meant to be limiting and intended to be broadly defined to encompass removable attachments, permanent attachments, fixed attachments, integrated, integral, etc. According to exemplary embodiments, in normal usage, the funnel assembly 204 and valve assembly 206 are not designed to be removed from the Sankey-D coupler 202 and nor is the funnel assembly designed to be detached from the valve assembly 206.

At the base of the Sankey-D coupler 202 are threads 216 configured to engage with complementary threads or teeth on the keg valve structure. The threads 216 may be engaged by positioning them onto the keg threads and twisting the Sankey-D coupler 202 until the threads 216 are fully engaged in order to lock the device 200 in place and create a seal with the keg valve.

Figure 2A:
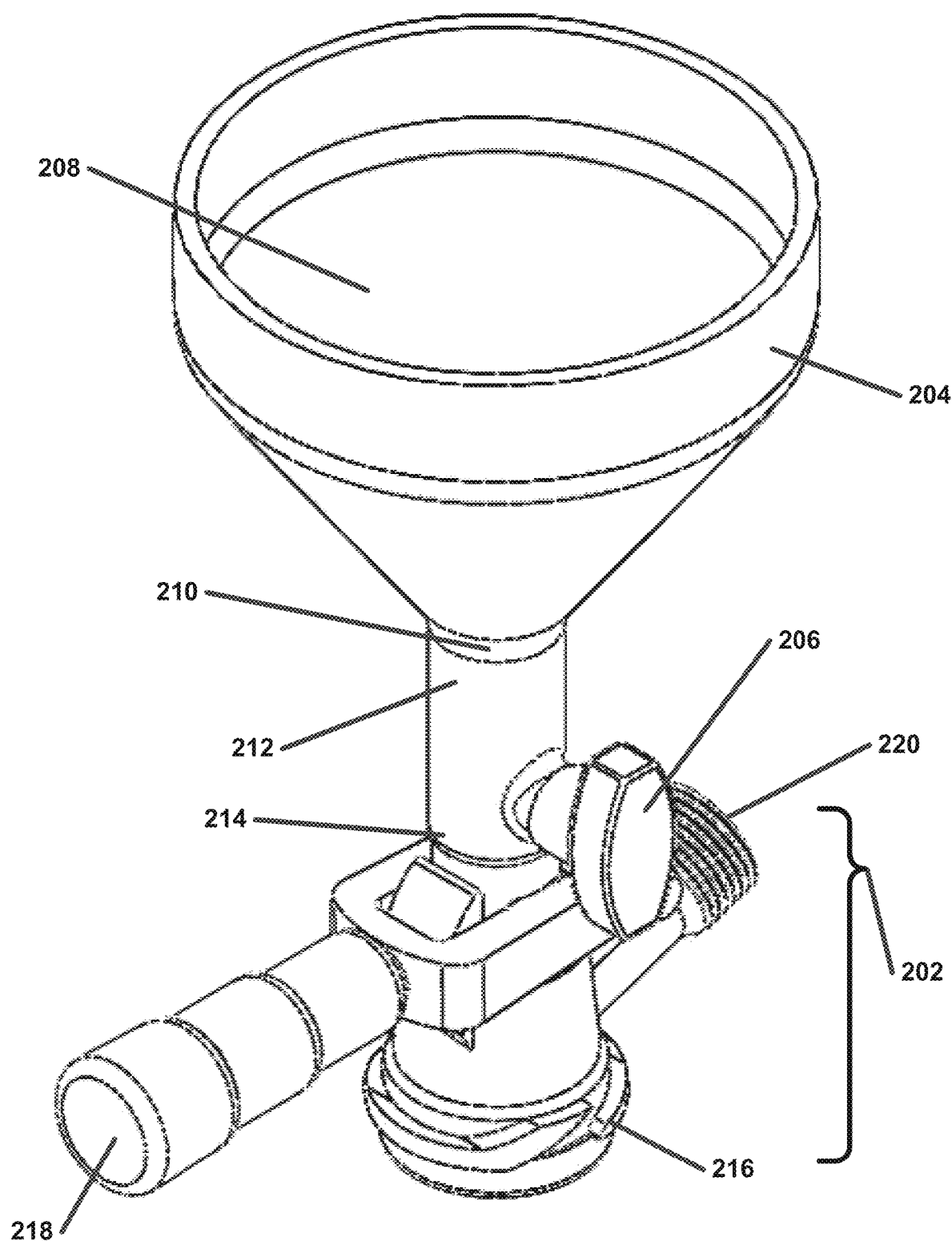
FIG. 2A illustrates a top perspective view of a filling apparatus, according to an embodiment.
Figure 2B:
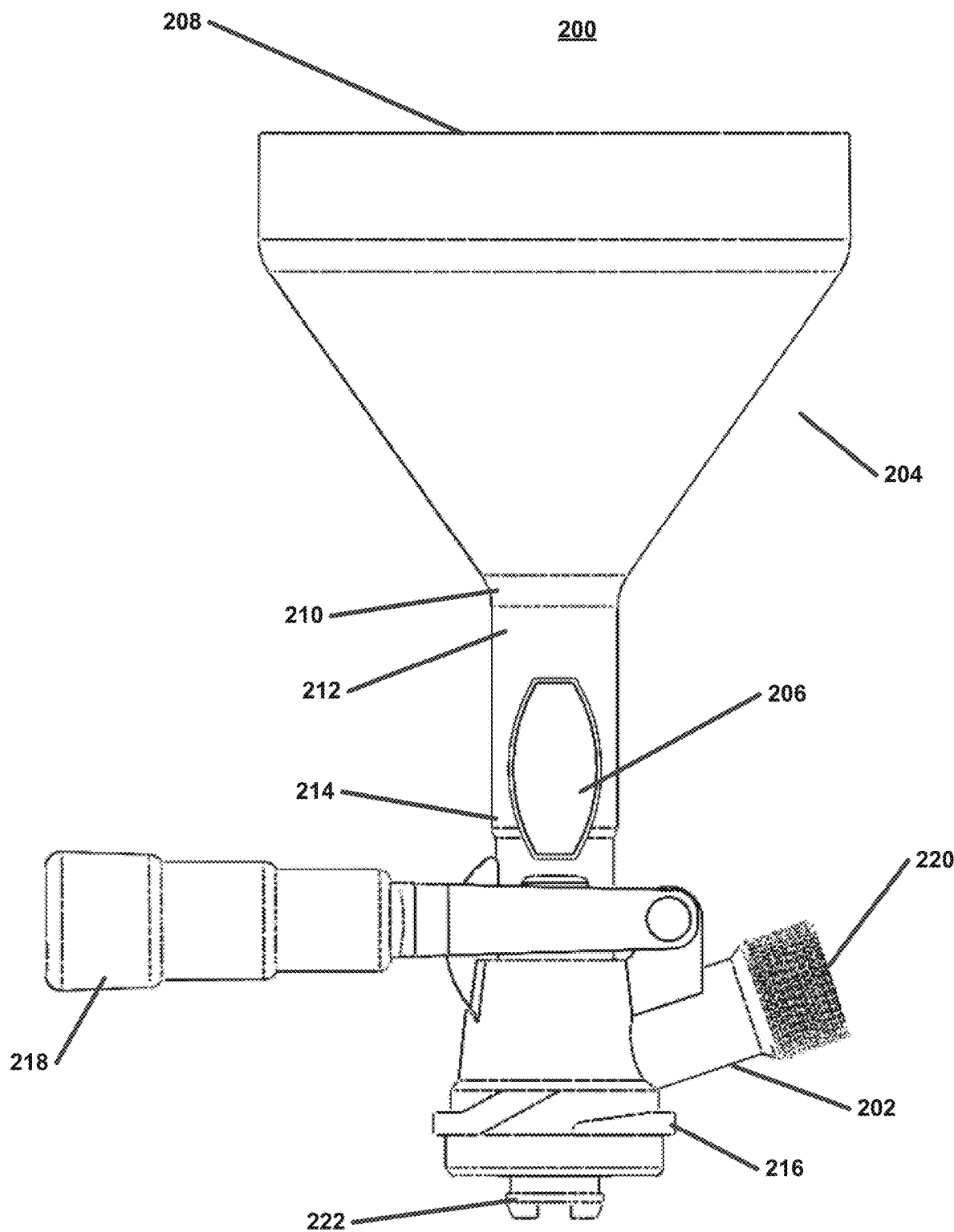
FIG. 2B illustrates a side view of the filling apparatus, according to an embodiment.
Figure 2C:
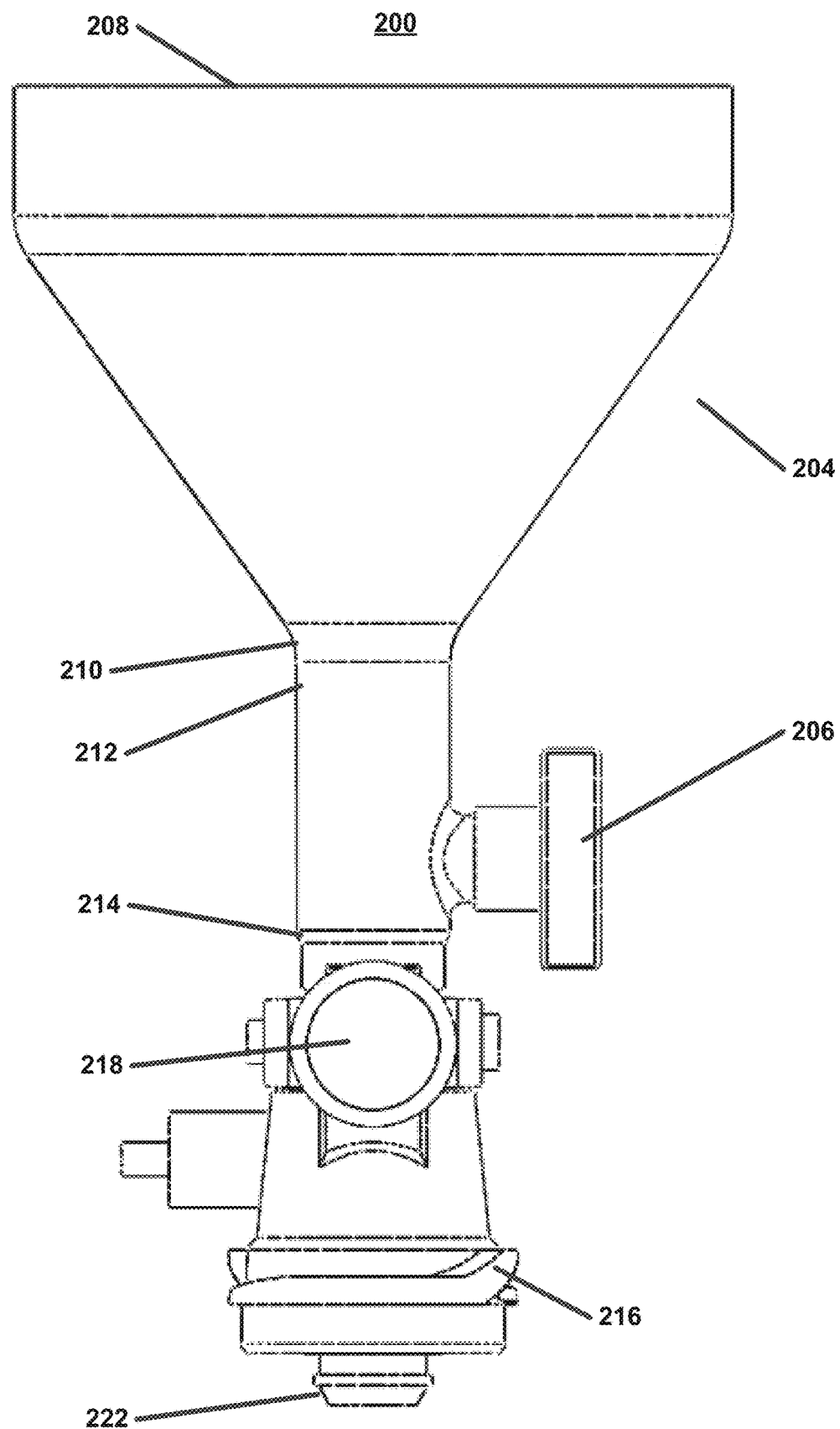
FIG. 2C illustrates a second side view of the filling apparatus, according to an embodiment.
Figure 2D:
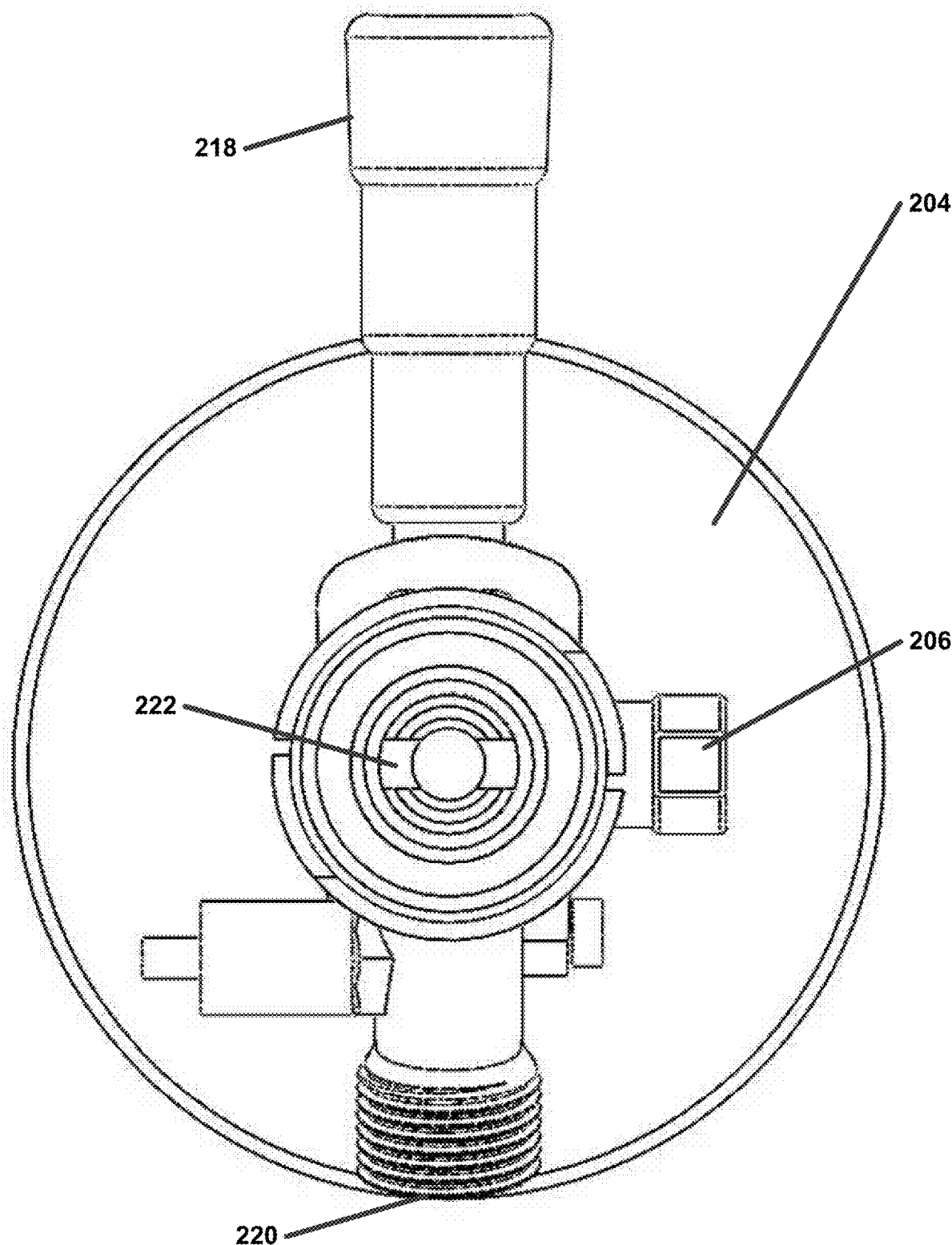
FIG. 2D illustrates a bottom view of the filling apparatus, according to an embodiment.
Figure 2E:
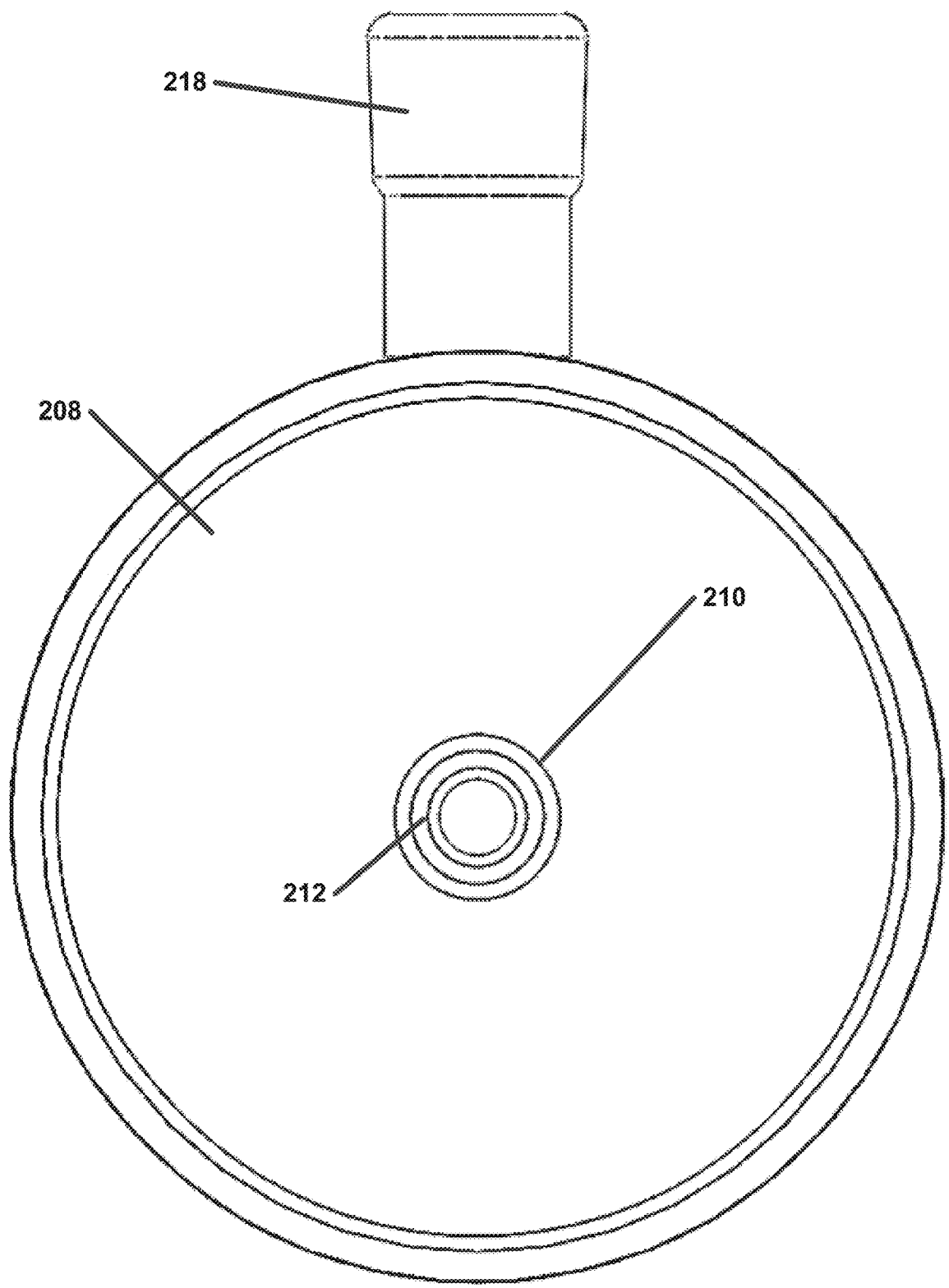
FIG. 2E illustrates a top view of the filling apparatus, according to an embodiment.

In FIGS. 2A, 2B, and 2C, for example, the handle 218 of the Sankey-D coupler 202 is in the down or engaged position. In this position, the probe 222 is in a lowered position to actuate the valve on the keg (see, e.g., FIG. 2B). One of ordinary skill in the art would understand how the Sankey-D coupler mates with and interacts with the valve assembly on a keg.

The vent opening 220 is left uncovered to allow a path for escape of gas from the Sankey-D coupler during filling operations. The vent opening 220 also allows for escape of gas during keg degassing prior to filling the keg. When the device 200 is engaged with the keg, the valve assembly 206 may be in the closed position. This closes off the liquid path through the device to prevent liquid flow upward from the keg but the vent passageway through the Sankey-D coupler is open and gas can exit the keg through the ring valve and up through the vent passage and out through the vent opening 220. This may be important because the keg is pressurized and contains liquid (e.g., the liquid pre-mix). For example, the keg spear, extending downward from the keg valve, and the keg valve, may be full of liquid that is pressurized by gas in the keg, which is above the surface of the liquid in the keg. Once the keg ball valve is depressed, a pathway for exit of that pressurized liquid is created. By keeping the liquid pathway through the device closed initially following engagement (i.e., keeping the valve assembly on the device in the closed position), liquid is prevented from escaping from the keg through the keg ball valve pathway that is opened by the device. Once the degassing is complete, the pressure on the liquid in the keg is relieved and the valve assembly may be opened to allow for liquid to be put into the keg through the device.

FIGS. 3A, 3B, 3C, 3D, and 3E (collectively referred to as FIG. 3) show a second device according to exemplary embodiments. The device 300 may have a lower portion 302 and an upper portion 304. The lower portion 302 may include a valve assembly 306, vent ports 308 and 310, a coupling ring 312, and a probe assembly 314. The upper portion 304 may have a funnel assembly 316 having an opening 318 and an outlet 320.

The valve assembly 306 may be housed in a cylindrical portion 322. The valve assembly may be constructed of metal, plastic, polymer, or any other semi-rigid or rigid material which is machinable, moldable, castable or formable with physical properties such that it is rigid and able to maintain its shape and be of sufficient strength and stiffness so as to allow it to functionally perform in the manner described herein.

Figure 3A:
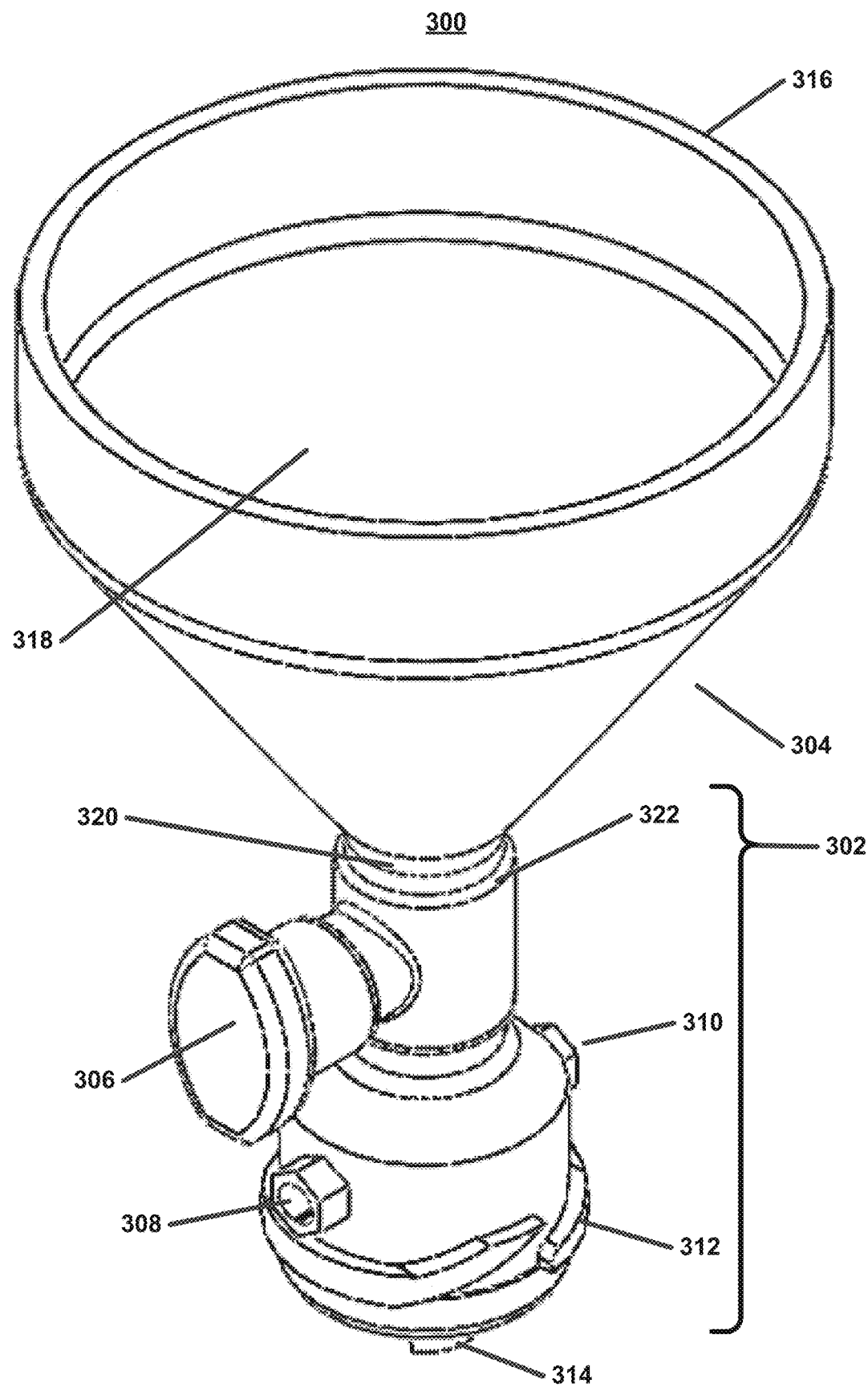
FIG. 3A illustrates a top perspective view of a filling apparatus, according to a second embodiment.
Figure 3B:
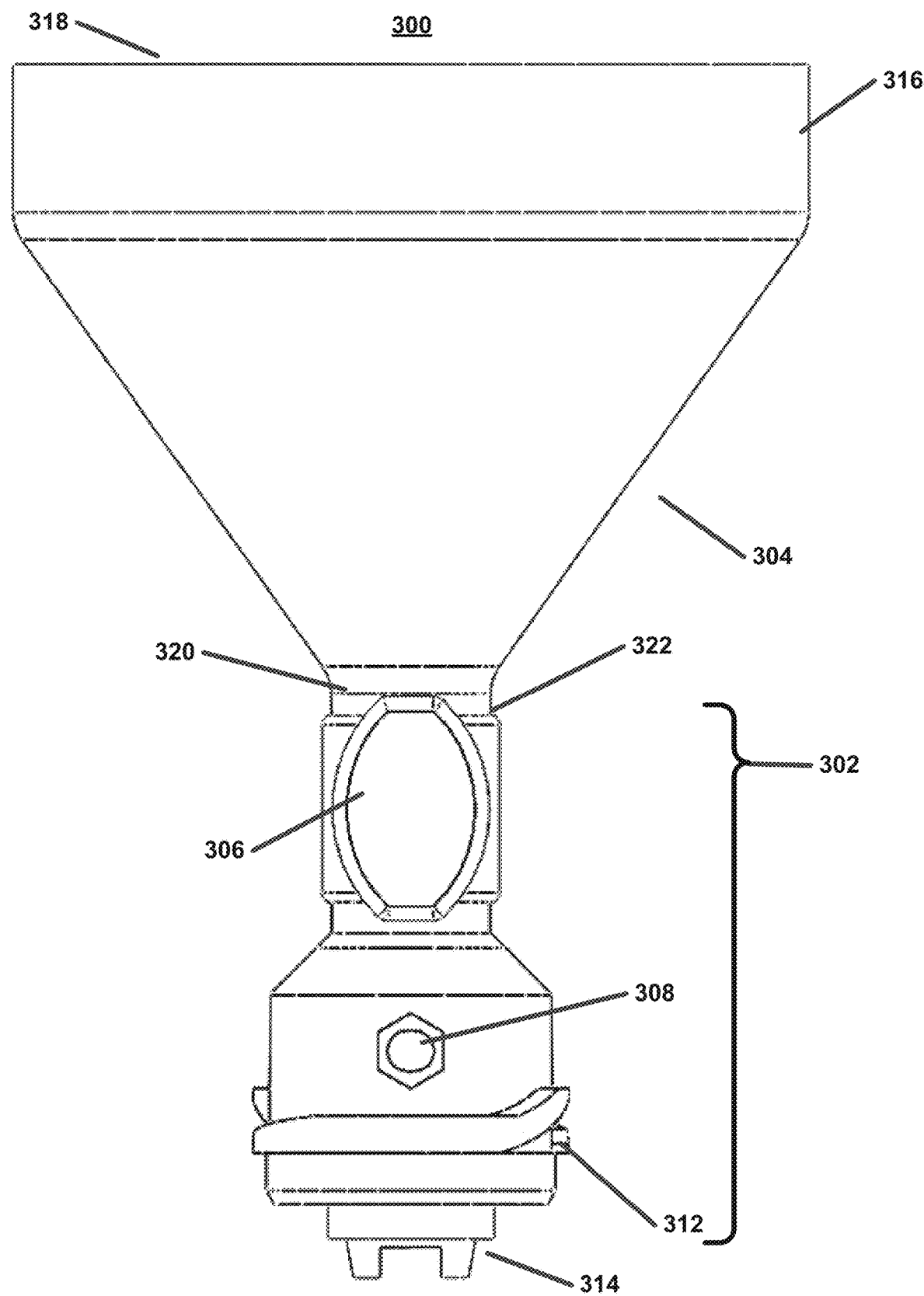
FIG. 3B illustrates a side view of the filling apparatus, according to a second embodiment.
Figure 3C:
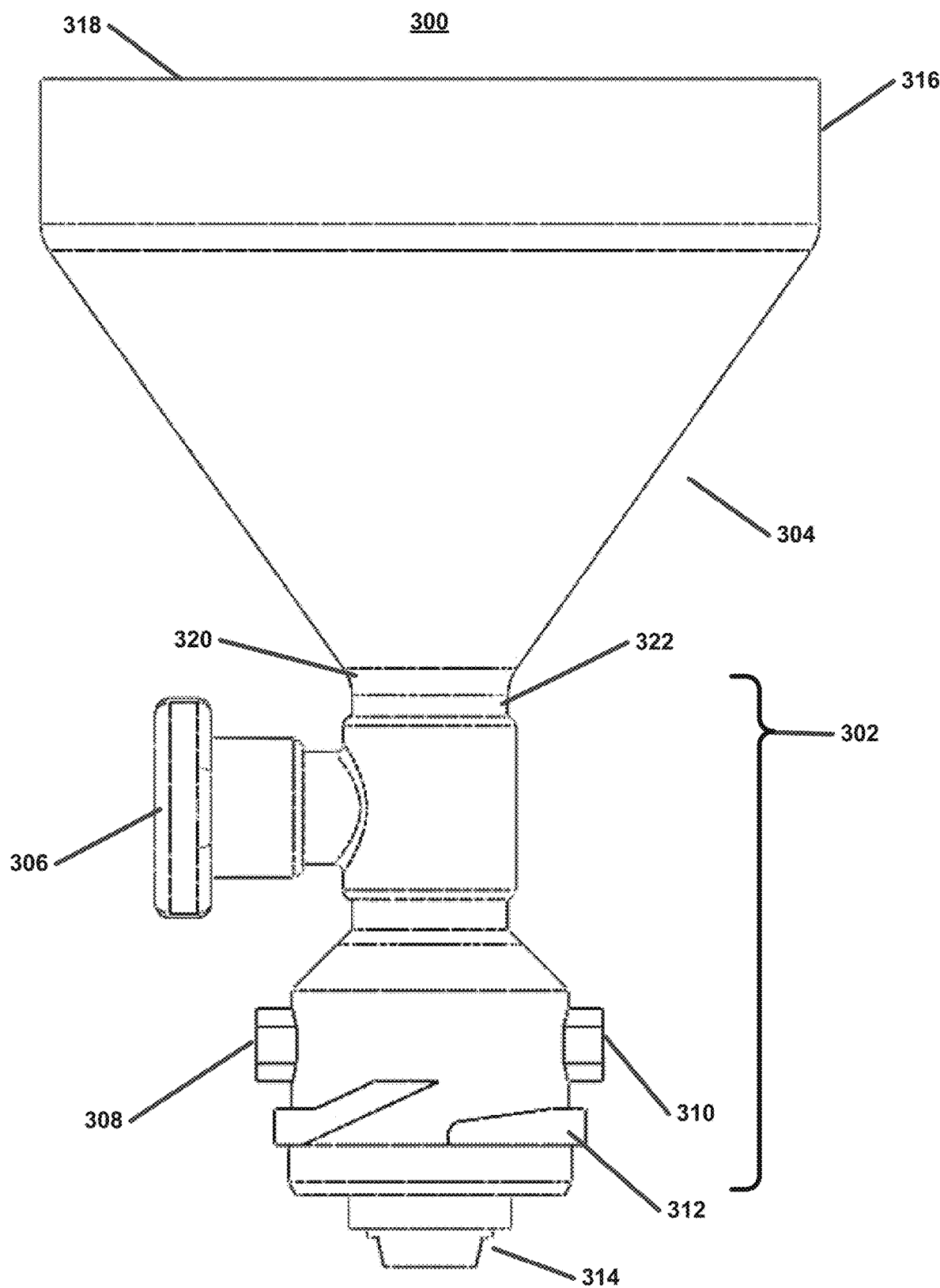
FIG. 3C illustrates a second side view of the filling apparatus, according to a second embodiment.
Figure 3D:
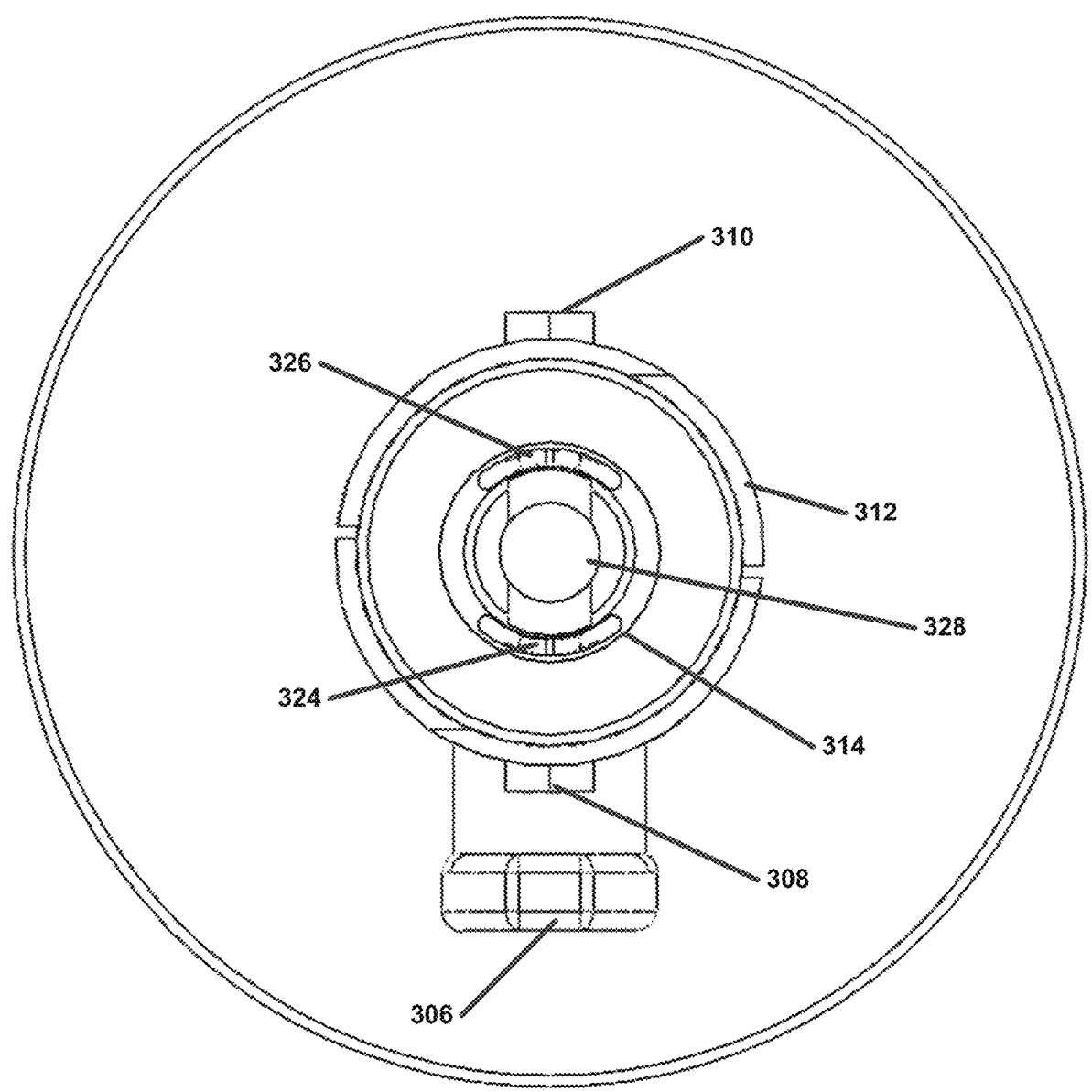
FIG. 3D illustrates a bottom view of the filling apparatus, according to a second embodiment.
Figure 3E:
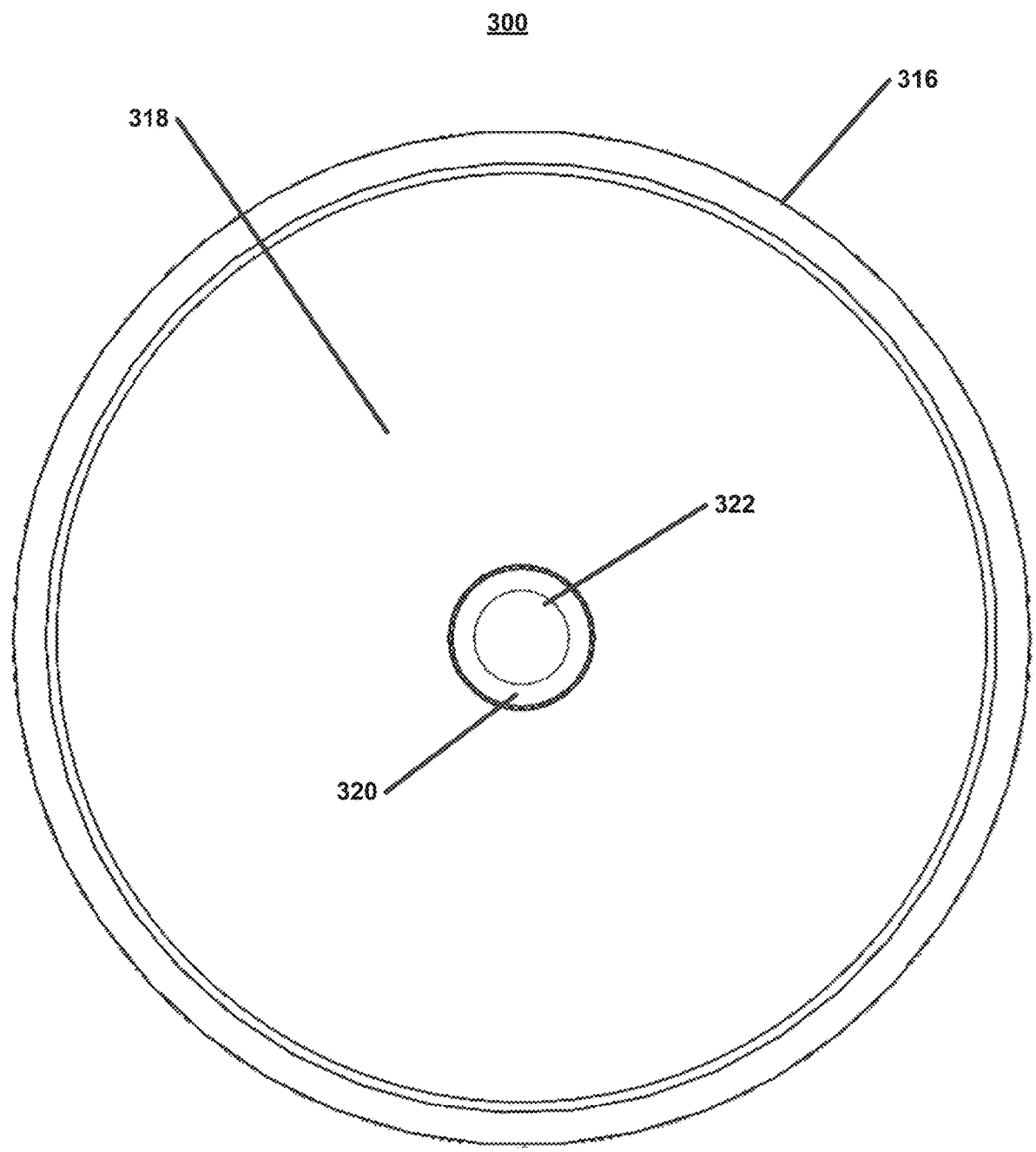
FIG. 3E illustrates a top view of the filling apparatus, according to a second embodiment.

The valve assembly 306 may have two positions: open and closed. In FIGS. 3A-3B, the valve assembly 306 is in an open position. This position allows for a fluid path from the outlet 320 through the valve into the lower portion 302. The second position closes off that fluid path. The valve assembly 306 may rotate through 90 degrees between the open and closed positions. The valve assembly 306 may be a ball valve. Other types of valves may be used such as a butterfly valve.

The opening 318 may be larger than the outlet 320. The opening 318 may be circular as shown. In various embodiments, the opening 318 may have other shapes, such as polygonal. The funnel assembly 304 may vertically taper down from the opening 318 to the outlet 320. The outlet 320 may be cylindrical and join with the valve assembly 306 at cylindrical portion 322. The valve assembly 306 be located above the vent ports and the coupling ring as shown in FIG. 3.

The funnel assembly 316 may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein. The funnel assembly may be of various sizes according to exemplary embodiments. For example, the funnel assembly may be sized to accommodate up one liter of fluid. In other embodiments, the funnel assembly may be of different sizes. For example, funnel assembly may be sufficiently large (e.g., about 5.5 inches wide by about 4.25 inches high) to accommodate a reasonable amount of fluid for flow into the keg to allow for filling of the keg in a minimum of time.

In exemplary embodiments, the funnel assembly 316 may be molded directly onto valve assembly 306. Others methods of joining may be used such as threading, welding, gluing, soldering, machining, carving, 3D printing, and so forth. According to exemplary embodiments, in normal usage, device 300 is designed to remain as one piece.

The probe assembly 314 may be configured to engage with the valve assembly in a keg. It may be configured to depress both the ball valve and the venting valve to allow for liquid flow into the keg and gas venting from the keg. The probe assembly 314 may have vent passages 324 and 326 that provide a gas pathway from upwards to the vent ports 308 and 310. The portion of the probe assembly with these vent passages may depress the ring valve or venting valve of the keg valve, while the center portion 328 may depress the ball valve or liquid valve portion of the keg valve.

These vent passages (324, 326) allow for gas to escape or vent from the keg in response to liquid being added to the keg. The vent passages also allow for gas escape during degassing of the keg, prior to filling with liquid. When the device 300 is engaged with the keg, the valve assembly 306 may be in the closed position. The reason for this is explained above with respect to FIG. 2 above. This closes off the liquid path through the device to prevent liquid venting because of the pressurization in the keg but the vent passageways are open (and the ring valve is depressed) and gas can exit the keg through the ring valve and up through the vent passages. Once the degassing is complete and the pressure in the keg on the liquid is relieved, the valve assembly may be opened to allow for liquid to be put into the keg through the device.

The coupling ring 312 may be configured to engage with complementary threads or teeth on the keg valve structure. The coupling ring 312 may be engaged by positioning it onto the keg valve locking threads or teeth, pushing down, and twisting until the coupling ring 312 fully engaged in order to lock the device 300 in place and create a seal with the keg valve.

FIGS. 4A, 4B, 4C, 4D, 4E, and 4F (collectively referred to as FIG. 4) show a third device according to exemplary embodiments. The device 400 may have a lower portion 402 and an upper portion 404. The lower portion 402 may include a valve assembly 406, a coupling ring 408, and a probe assembly 410. The upper portion 404 may have a funnel assembly 412 having an opening 414 and an outlet 416.

The valve assembly 406 may be housed in a cylindrical section 418. The valve assembly may be constructed of metal, plastic, polymer, or any other semi-rigid or rigid material which is machinable, moldable, castable or formable with physical properties such that it is rigid and able to maintain its shape and be of sufficient strength and stiffness so as to allow it to functionally perform in the manner described herein.

Figure 4A:
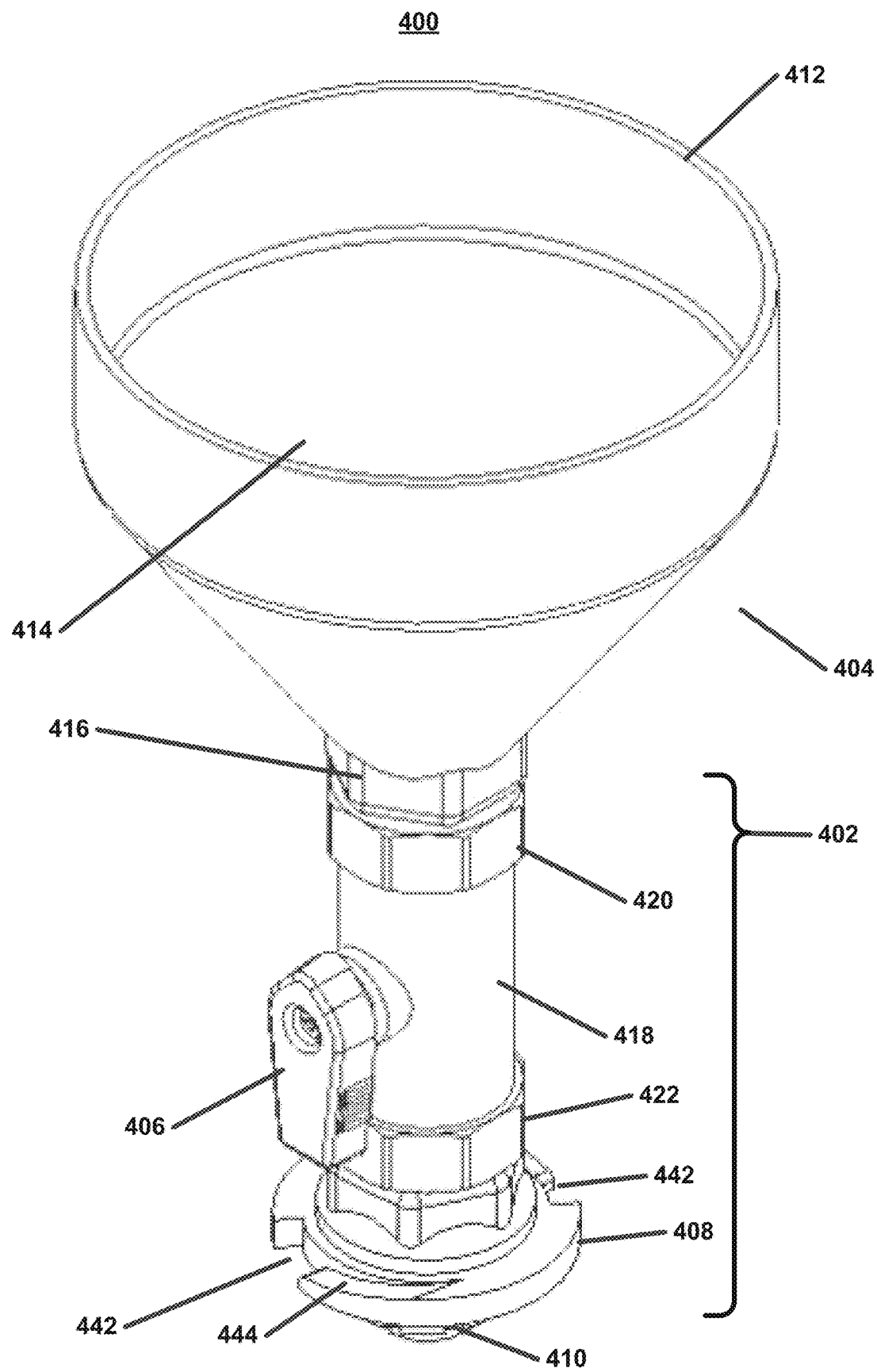
FIG. 4A illustrates a top perspective view of a filling apparatus, according to a third embodiment.
Figure 4B:
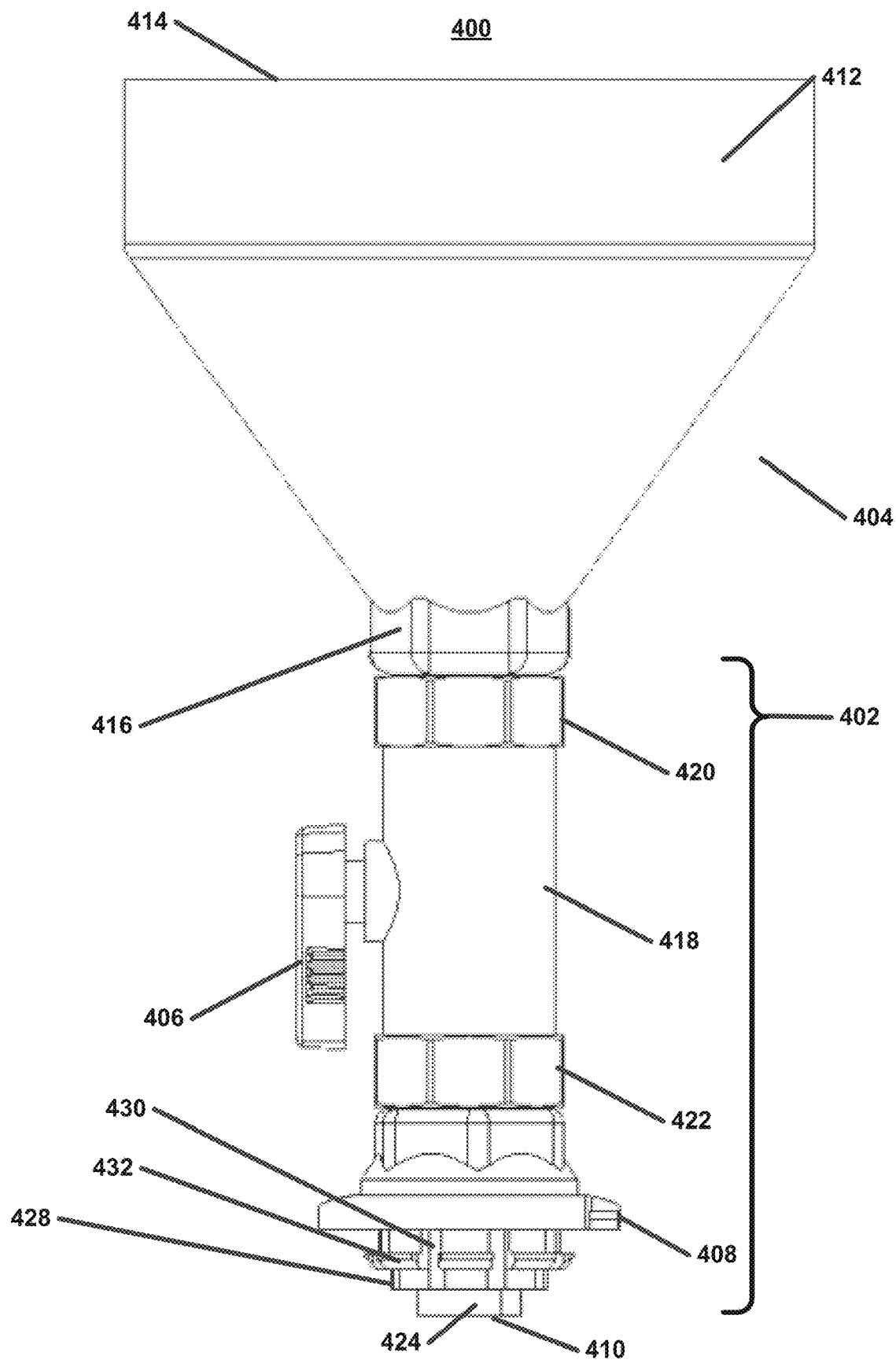
FIG. 4B illustrates a side view of the filling apparatus, according to a third embodiment.
Figure 4C:
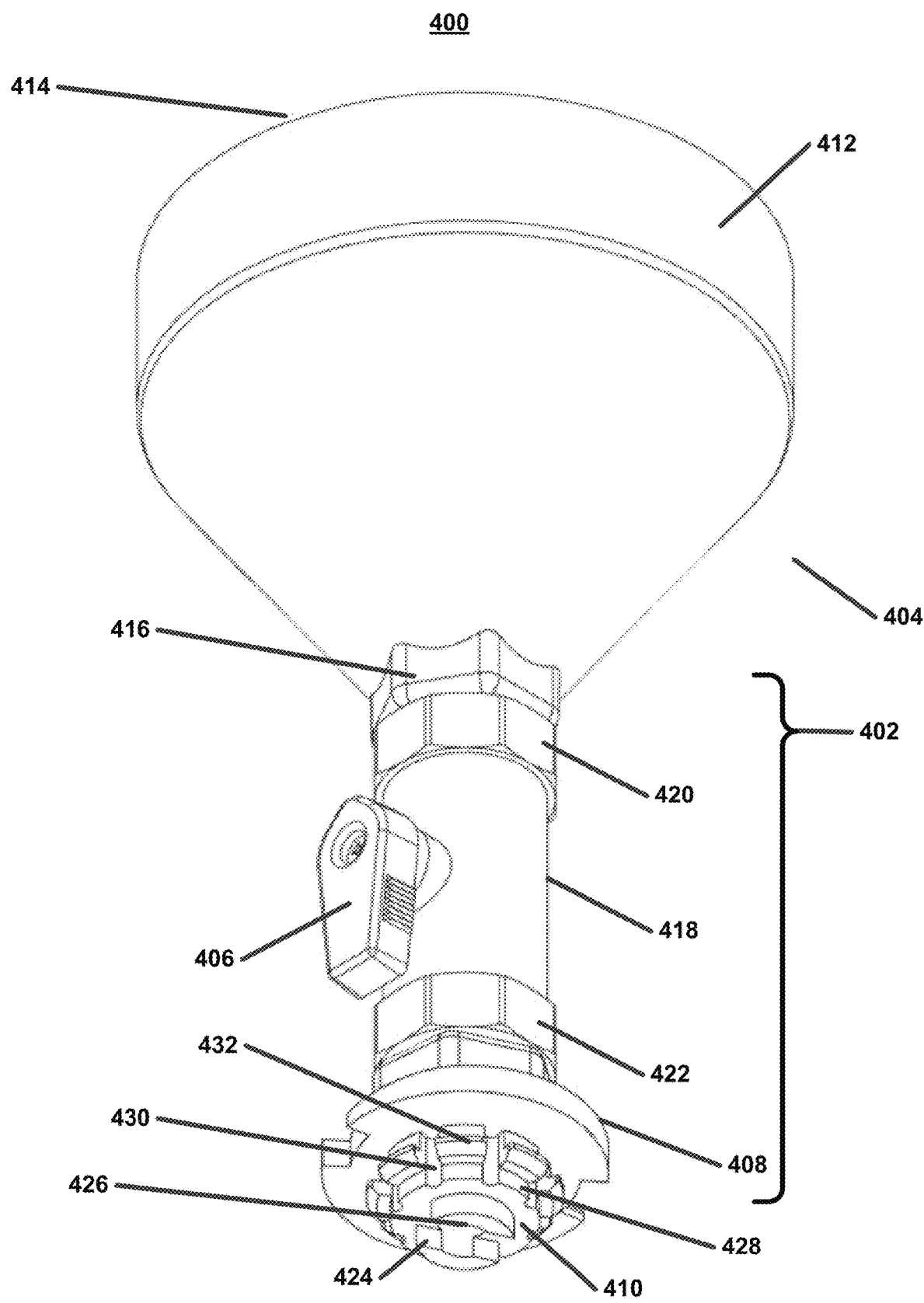
FIG. 4C illustrates a bottom perspective view of the filling apparatus, according to a third embodiment.

The valve assembly 406 may have two positions: open and closed. In FIGS. 4A-4C, the valve assembly 406 is in an open position. This position allows for a fluid path from the outlet 416 through the valve into the lower portion 402. The second position closes off that fluid path. The valve assembly 406 may rotate through 90 degrees between the open and closed positions. The valve assembly 406 may be a ball valve. Other types of valves may be used such as a butterfly valve.

The opening 414 may be larger than the outlet 420. The opening 414 may be circular as shown. In various embodiments, the opening 414 may have other shapes, such as polygonal. The funnel assembly 404 may vertically taper down from the opening 414 to the outlet 416. The outlet 416 may be cylindrical and join with the valve assembly 406 at an upper portion 420 cylindrical portion 418.

Figure 4D:
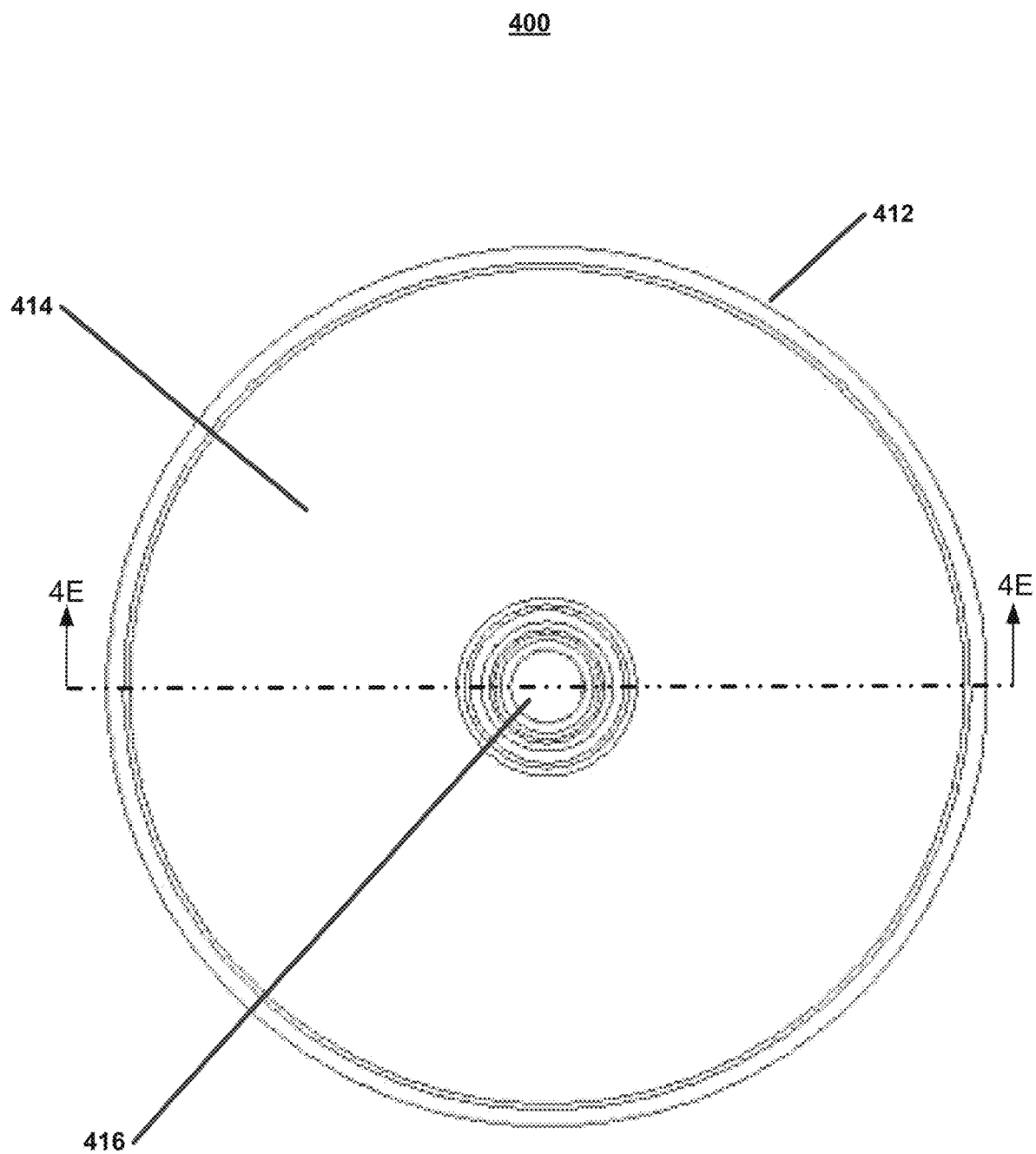
FIG. 4D illustrates a top view of the filling apparatus, according to a third embodiment.

The funnel assembly 412 may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein. The funnel assembly 412 may have wall thickness 446 as shown in FIG. 4D. The funnel assembly may be of various sizes according to exemplary embodiments. For example, the funnel assembly may be sized to accommodate up one liter of fluid. In other embodiments, the funnel assembly may be of different sizes. For example, funnel assembly may be sufficiently large (e.g., about 5.5 inches wide by about 4.25 inches high) to accommodate a reasonable amount of fluid for flow into the keg to allow to filling of the keg in a minimum amount of time.

In exemplary embodiments, the funnel assembly 412 may be threaded onto valve assembly 406 at an upper portion of cylindrical section 418. Others methods of joining may be used such as molding, welding, gluing, soldering, machining, carving, 4D printing, and so forth. According to exemplary embodiments, in normal usage, device 400 is designed to remain as one piece.

The coupling ring 408 may be configured to engage with the keg valve structure. The coupling ring 408 may be engaged by positioning it onto the keg, pushed down, and twisting until the coupling ring 408 fully engaged in order to lock the device 400 in place and create a seal with the keg valve. The coupling ring 408 may have two cut-outs 442 that are configured to engage with two teeth located on the valve structure of the keg. This locks the device 400 into place. After the teeth are positioned into each cut-out 442, a ramped portion 444 may allow for locking engagement of the coupling ring 408 with the keg valve structure when twisted or turned into place.

The portion of lower assembly 402 containing the coupling ring 408 and probe 410 may be threaded onto the valve assembly 406 at a lower portion 422 of cylindrical section 418.

In FIG. 4C the detail of the probe 410 is illustrated. The probe 410 may include a portion 424 to engage with and depress the ball valve on the keg. The portion 424 may consist of two hemispherical structures as shown that surround liquid pathway 426. Ridged portion 428 may engage with and depress the ring valve on the keg. Passageways 430 may provide a pathway for gas venting from the keg during filling operations with the device 400. As can be seen, there may be multiple pathways 430, allowing for multiple gas venting pathways, to increase liquid flow into the keg. Teeth 432 may provide standoff for the device 400 when engaged with the keg to create a gap allowing for the gas to escape. FIG. 4D shows a view looking downward into the funnel portion 412 (i.e., through the opening 414). The funnel exit 416 portion can be seen at the center of the figure.

Figure 4E:
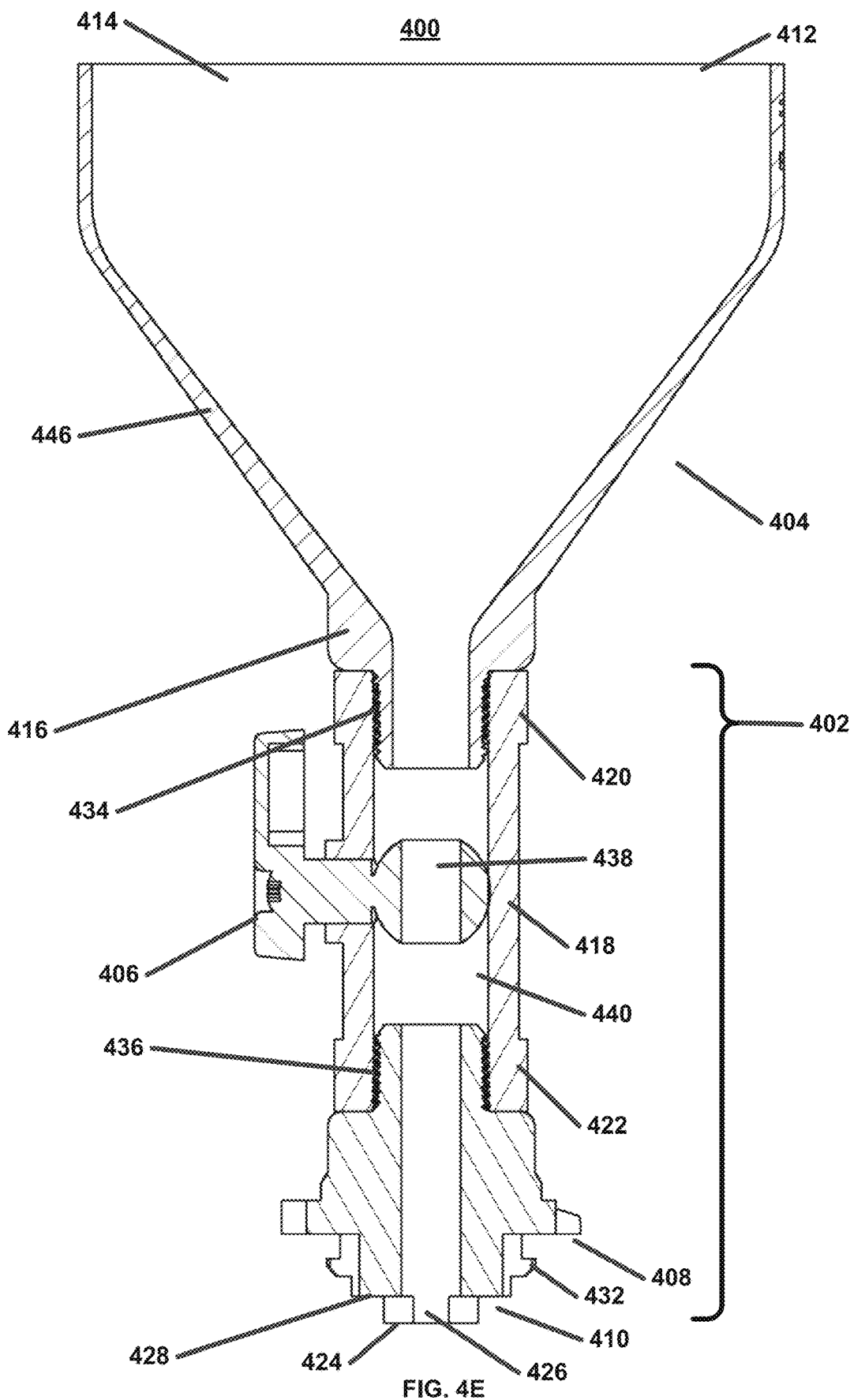
FIG. 4E illustrates a cross-sectional view of the filling apparatus, according to a third embodiment.
Figure 4F:
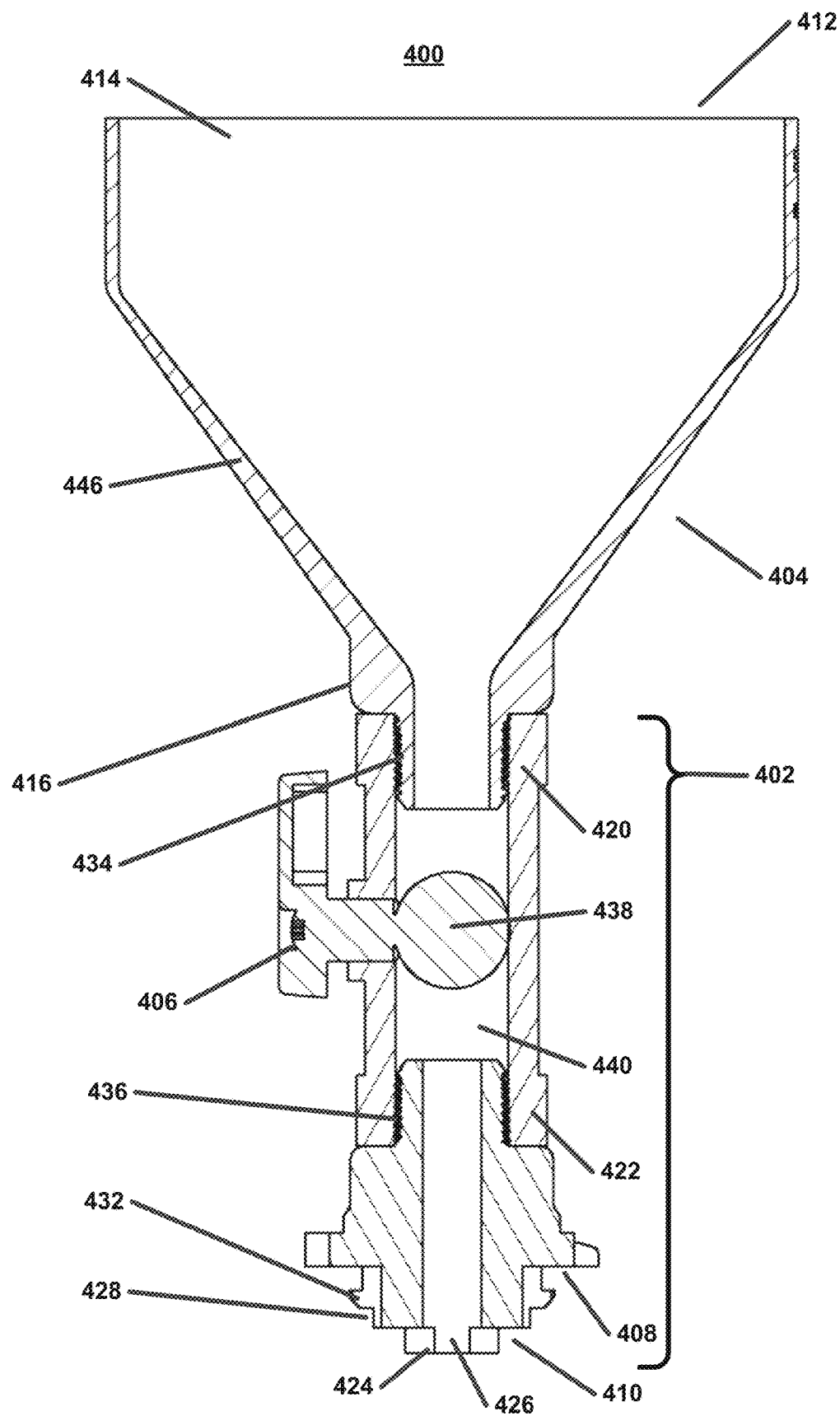
FIG. 4F illustrates a cross-sectional view of the filling apparatus, according to a third embodiment.

FIGS. 4E and 4F depict the internal structure of the device 400. In FIG. 4E, the valve assembly is depicted in an open position, creating a liquid pathway straight through the device. FIG. 4F, which is a cross-section taken along the same cut-line as FIG. 4E, depicts the valve assembly in a closed position, shutting the liquid pathway from the upper portion through the lower portion. The threaded connections 434 and 436 between 416 and 420 and 408 and 422 can be seen. The internal structure of the valve assembly 406, in this embodiment, a ball valve 438 is in the open position. A liquid pathway 440 exists between the lower portion 416 of the funnel portion 412, the valve 438 (in the open position), and the probe assembly 410. The liquid pathway 440 may increase in size after threaded section 434 through the valve section 438 and then taper down to threaded portion 436. Thus, when the valve assembly 406 in the open position, liquid may enter the funnel assembly 412 at its upper opening 414 and flow downward through the device 400, including passing through the valve 438, eventually existing the probe assembly 410 between the portion 424 (at liquid pathway 426). When the device 400 is engaged with a keg, the liquid may flow from the device into the ball valve portion of the keg valve and into the keg. FIG. 4F depicts the valve 438 in the closed position.

When the device 400 is engaged with the keg, according to exemplary embodiments, the valve assembly 406 may be in the closed position. This closes the liquid pathway through the device 400. The reason for this is explained above with respect to FIG. 2 above. This closes off the liquid path through the device to prevent liquid venting because of the pressurization in the keg, but the passageways for the gas in the keg are open and that gas can exit the keg through the ring valve and up through the passageways in the device as described above. Once the degassing is complete and the pressure in the keg on the liquid is relieved. Once that is complete, the valve assembly may be opened and liquid filling commenced.

The filling apparatus according to exemplary embodiments disclosed herein can be used to dispense one or more liquids into a keg. According to exemplary embodiments, the keg may be filled with a liquid pre-mix. The liquid pre-mix may be non-alcoholic. The liquids dispensed into the keg, according to exemplary embodiments, include alcoholic spirits. However, non-alcoholic liquids may be dispensed.

Figure 5:
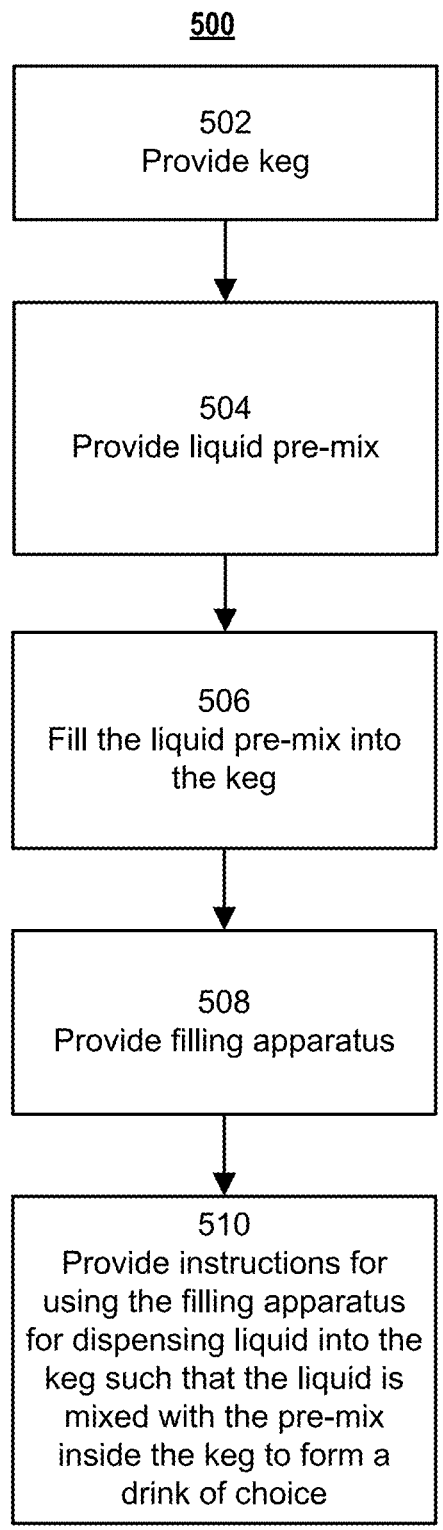
FIG. 5 is a flow chart for an example process of providing a keg partially filled with a non-alcoholic, liquid premix, according to an embodiment.

FIG. 5 illustrates a flow chart for an example process 500 for providing a keg partially filled with a non-alcoholic, liquid premix, according to one embodiment of the invention. The process 500 may be performed, for example, by a user such as a provider or manufacturer of non-alcoholic, liquid pre-mixes for making mixed drinks. The process 500 may include the following steps.

In step 502, a keg is provided. The keg may be any suitable keg, such as a keg with a standard valve that connects to a standard coupler, such as the Sankey A, D, G, M, S, or U type systems. The keg may be a one-time use keg. In a preferred embodiment, the keg includes a Sankey-D ball valve which is compatible with the Sankey-D coupler that is widely used in bars, restaurants, and other establishment and venues for serving beer on draft. The keg may include a keg bung in a top portion of the keg. The keg bung may be provided with a ball-valve inside the keg bung for, for example, allowing liquid to flow out of the keg but not into the keg. The keg bung may further include other valves, for example, a venting valve (e.g., gas or CO2 valve) that allows flowing gas into to the keg to pressurize liquid out of the keg when the keg is in regular use. The venting valve may be a ring valve that surrounds the ball valve structure. For example, in normal use of the keg, when being dispensed, the venting valve (e.g., CO2 valve) is opened to add pressure to the top of the liquid in the keg, so when the tap is opened at the bar, liquid can flow through the ball valve (also known as a beer valve) out of the keg. The venting valve can also be used to release gas from the keg when adding liquid to the keg, such as, for example, in exemplary embodiments. The Sankey-D coupler, once attached to the keg, can serve two functions: 1) it opens both the venting valve and the ball or beer valve simultaneously so that pressure can be added to the top of inside of the keg, and 2) the liquid can be released from the keg through the ball valve once the tap is opened on the bar, in a restaurant, and/or at other event venues.

In step 504, a liquid pre-mix is provided. The liquid pre-mix may be any desired non-alcoholic pre-mix, including but not limited to, a liquid premix for margaritas, mojitos, mules, Paloma, Tonic, Lemonade, Cola, Seltzer, and/or Sodas. The liquid pre-mix may also comprise a single product such as Coca Cola for a rum and Coke mixed drink, or tonic water for a gin and tonic drink.

In step 506, the liquid pre-mix is filled into the keg to a first desired portion of a capacity of the keg. The liquid pre-mix may be filled into the keg in any manner using any suitable devices or systems as known in the art. The first desired portion of the capacity may be about two thirds of the capacity of the keg according to one embodiment. For example, if the capacity of the keg is about 30 liters, the first desired portion of the capacity may be about 21 liters. Other mix ratios are possible. For example, there are 12.5 liter, 19 liter, and 10 liter kegs. The mix ratio would change therefore based on the keg capacity.

In step 508, the filling apparatus is provided to engage the keg. In various embodiments, the filling apparatus may be provided to an end user. The filling apparatus may be provided with the keg that is filled with the pre-mix as described above. The filling apparatus may be referred to as a keg spiker. The filling apparatus may be that described herein according to exemplary embodiments. The filling apparatus may be engaged with the keg at a later time, such as at a location of an end user.

In step 510, instructions for using the filling apparatus for dispensing the liquid (e.g., alcohol) into the keg is provided to an end user. The instructions may describe how the alcoholic liquid is mixed with the non-alcoholic pre-mix inside the keg to form a mixed drink of choice. This step may be optional.

Figure 6:
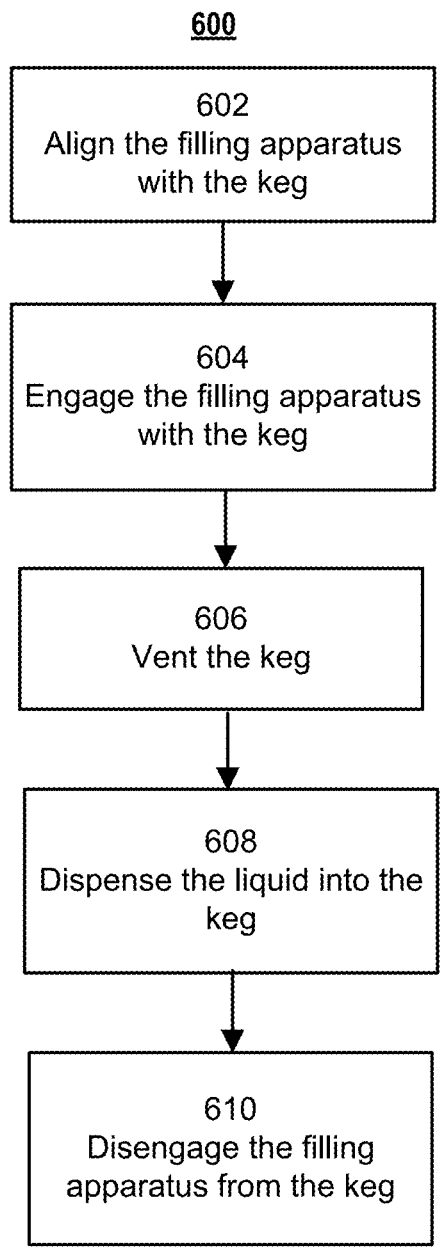
FIG. 6 is a flow chart for an example process of using a filling apparatus for dispensing a liquid into a keg, according to exemplary embodiments.

FIG. 6 illustrates an example of a method of using the filling apparatus to dispense the liquid into a keg. The method 600 may include the following steps.

In step 602, the filling apparatus is aligned with the keg bung disposed in the top portion of the keg. For example, by grasping and manipulating the filling apparatus, the bottom terminal of the filling apparatus is in a position ready for fitting into the keg bung.

In step 604, the filling apparatus is engaged with the keg bung by twisting the filling apparatus clockwise, according to one embodiment, so as to be able to simultaneously depress and open at least a portion of the keg bung valve (e.g., the ball valve and/or the venting valve) received in the keg bung and lock the filling apparatus into place to the keg bung. Securing the filling apparatus onto the keg bung can be achieved with the locking ring or coupling ring and the keg locking slots or teeth that engage with the ring on the device. Locking securely is required to create a tight non-leaking seal to the keg. According to exemplary embodiments, one embodiment may require depression of the lever on the Sankey-D coupler to extend the probe section to displace the ball valve structure of the keg. Other embodiments, may only require securing as described above to secure the filling device and actuate the valve structure of the keg, as described above. During the engagement and following the engagement, the filling apparatus valve on the filling device may remain closed. This may allow for degassing of the keg to relieve pressure on the liquid (e.g., pre-mix in the keg) and prevent the liquid from exiting out of the keg and through the filling device. The gas vented may be a nitrogen gas, a carbon dioxide gas, an air gas, or combinations thereof.

In step 606, the keg is degassed or vented. This occurs because the gas in the keg now has an exhaust path through the filling apparatus. With the filling apparatus valve closed, the gas may vent though the vent opening(s) on the filling apparatus and to relieve pressure on the liquid in the keg. Otherwise, if the valve was opened on the filling apparatus, liquid may exit under pressure through the keg ball valve and out through the filling apparatus. Once the keg is degassed and the pressure relieved in the keg, the valve may be opened to open the liquid pathway.

In step 608, the liquid, e.g., alcoholic spirits, is dispensed into the keg to a second desired portion of the capacity of the keg. In order to dispense the liquid into the keg, the filling apparatus valve is opened creating a pathway from the funnel portion of the filling apparatus and into the keg through the ball valve. While the liquid is dispensed into the keg, further gas may be released from inside of the keg through the venting valve and through venting opening on the filling device.

The liquid may be added in volume to a desired portion of the keg capacity. This can be all or a portion of the remaining keg capacity (i.e., capacity not filled with the pre-mix). For example, if the keg has been filed ⅔ full of the non-alcoholic, liquid cocktail mix, the remaining portion, used to pour in the alcohol, can be up to the remaining ⅓ of the keg capacity. Thus, if the capacity of the keg is about 30 liters and the pre-mix volume is about 21 liters (the non-alcoholic, liquid pre-mix is filled up to about 21 liters), the remaining portion added with the filling apparatus may be up to 9 liters. Different amounts of the liquid dispensed into the keg may form different flavors or varieties of the mixed drink. It should be appreciated that various ratios of liquid pre-mix and additive liquid may be used as desired to achieve the desired drink mix and flavoring. It should also be appreciated that the volume of alcohol added to the keg depends on the keg capacity as there are other keg capacities (i.e., different than 30 liters described above). For example, there are 12.5 liter, 19 liter, and 10 liter kegs. The volume amount of pre-mix and alcohol thus may be adjusted accordingly based on the keg capacity.

The liquid dispensed into the keg using the apparatus can be any suitable liquid for forming the drink of choice by mixing the dispensed liquid with the pre-mix inside the keg. For example, the liquid dispensed into the keg using the apparatus can be alcoholic spirits of various amounts to form various mixed drinks. Different types of alcoholic spirits may be added to the keg to form a blend with the pre-mix. For example, different flavors of an alcoholic spirit may be added together to the keg or different types of alcohol may be added to the keg. The proportions and the type of alcohol (or other liquid) added to the pre-mix may change the flavor of the resulting drink in the keg.

In step 610, the filling apparatus is disengaged from the keg. After dispensing the liquid into the keg, the filling apparatus may be disengaged from the keg bung and removed. The filling apparatus may be removed by rotating it in a counter-clockwise direction to disengage it from the locking threads of the keg bung. That is, the reverse operation of step 604 may be performed. In exemplary embodiments, the lever on the Sankey-D coupler may be required to be raised to disengage the probe section from the valve.

In some embodiments, the method 600 may further include shaking the keg to significantly mix the non-alcoholic liquid pre-mix and the alcohol inside the keg to form the drink of choice. For example, the keg may be shook for 15 seconds to ensure that the fluid volume in the keg is sufficiently mixed to ensure a consistent output mixture.

In some embodiments, the method 600 may include engaging the keg spear or valve assembly with a standard dispensing apparatus to dispense the drink of choice. For example, in a bar, the keg may be set up with a standard Sankey coupler to dispense the mixed drink to customers, that is, to provide a mixed drink on draft through a standard Sankey coupler and tap, which are widely used for serving beer in bars, restaurants and other establishments.

Figure 7A:
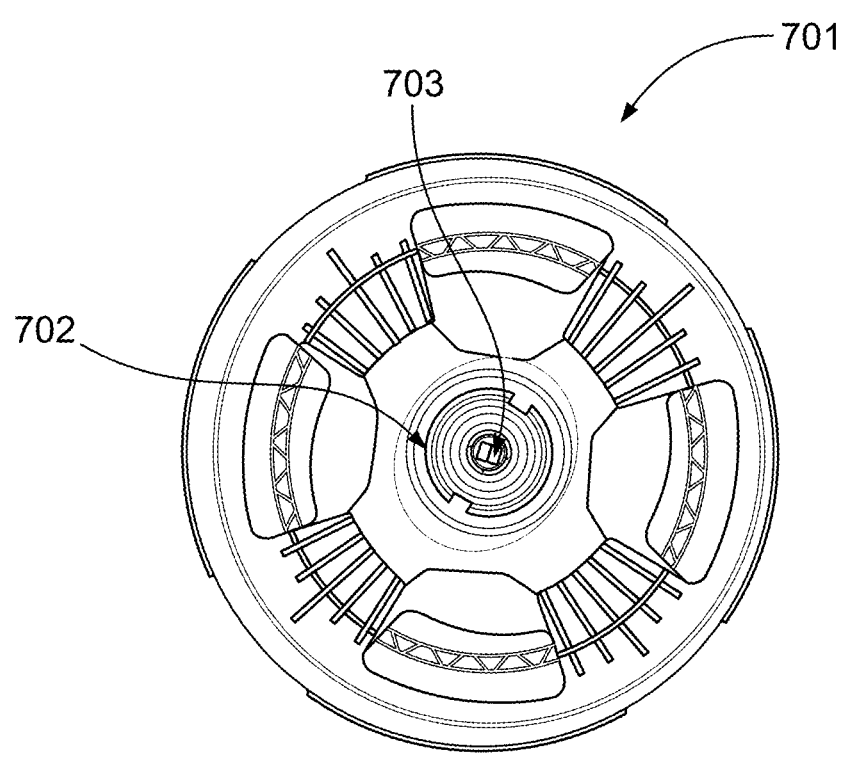
FIG. 7A illustrates a top view of a keg according to an exemplary embodiment.

FIG. 7A illustrates a top view of an example keg 701, according to an embodiment of the invention. The keg 701 shown in FIG. 7A may be a conventional steel keg or a one-time use plastic keg. In various embodiments, the key may be of any type and may be made of any material, such as a recyclable material, plastic, metal. The keg may be clear or opaque. As shown in FIG. 7A, a keg bung assembly 702 is coupled to the top of the keg 701. The keg bung assembly 702 may be removably coupled to the keg 701 or may be integrated to the keg 701 (e.g., by molding, melding, or soldering). The keg bung assembly 702 may comprise a keg valve 703 (e.g., a ball valve and venting valve with a tube attached, i.e., a keg spear). In some embodiments, a tube may not be attached. When the filling apparatus disclosed herein is coupled to the keg 701 via the bung assembly 702, the keg valve 703 can be pressed open to allow for filling liquid into the keg 701 while venting gas out of the keg 701, as described herein.

Figure 7B:
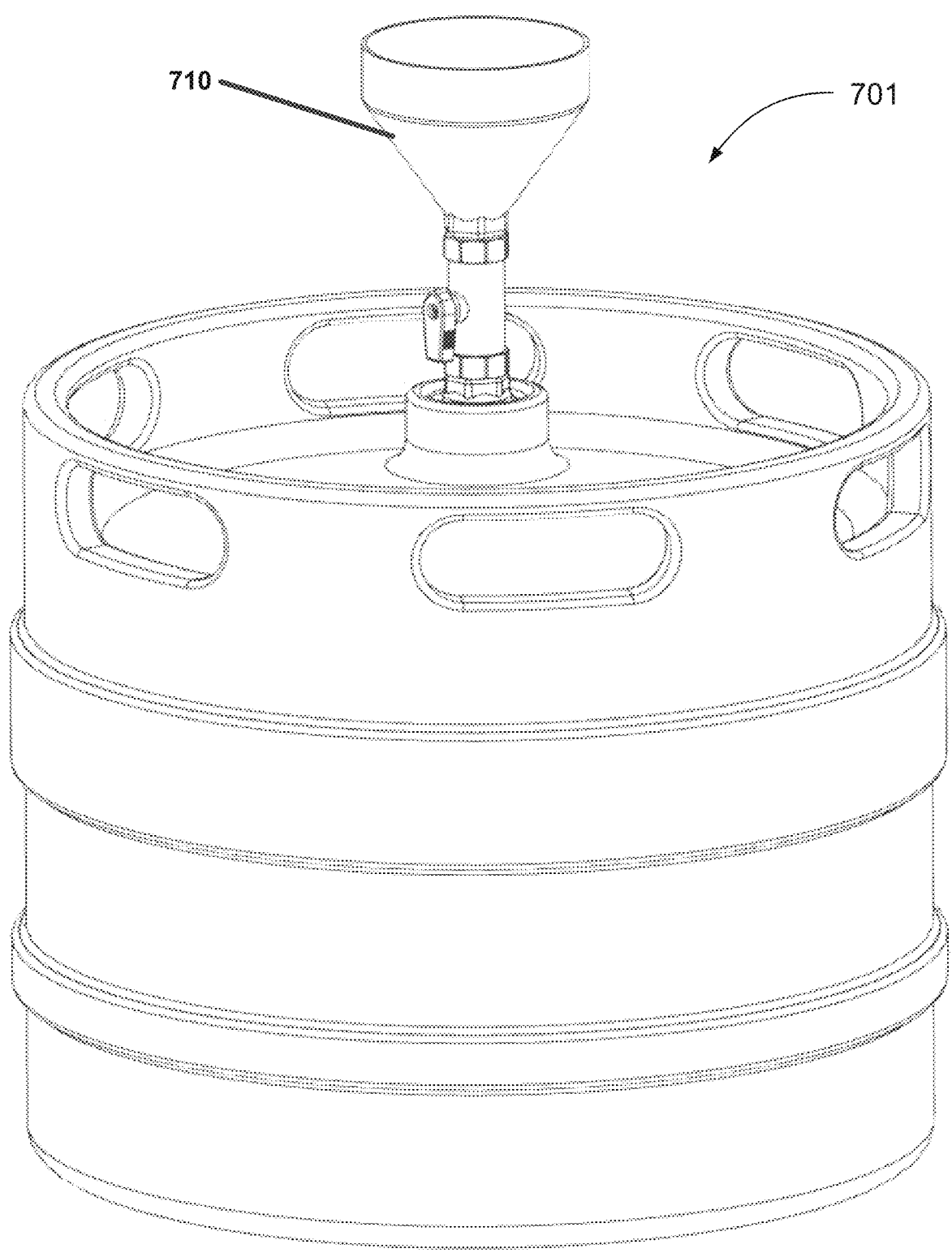
FIG. 7B illustrates a perspective view of a keg with a filling apparatus according to an exemplary embodiment engaged thereto.

FIG. 7B depicts a keg 701 with a device 710 according to exemplary embodiments engaged therewith. For example, the device may be that shown in FIG. 2 or FIG. 3.

Figure 7C:
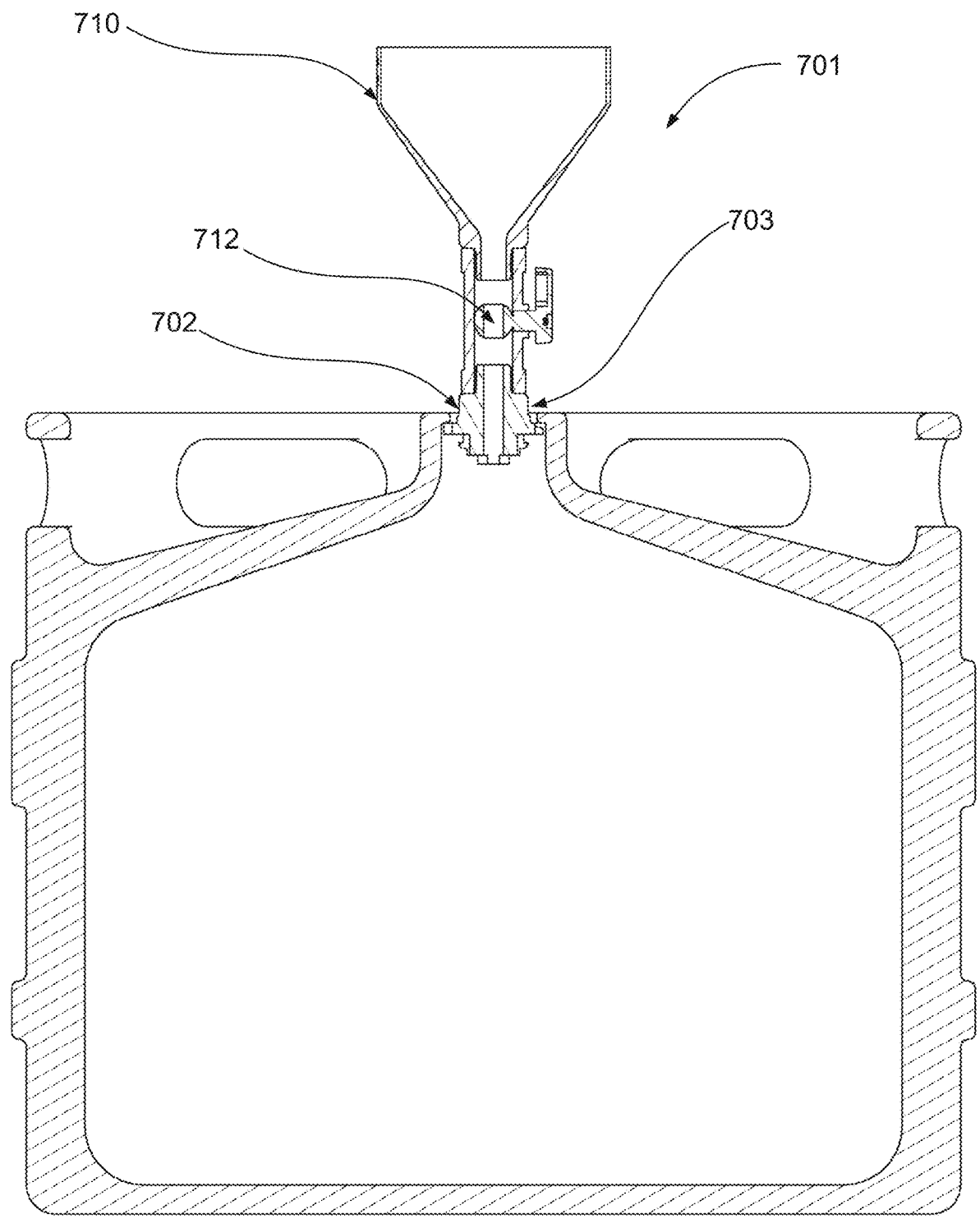
FIG. 7C illustrates a cross-section view of a keg with a filling apparatus according to an exemplary embodiment engaged thereto.

FIG. 7C shows a cross section of a keg 701 with the device 710 engaged thereto. Not shown in FIG. 7C is the keg spear portion which may extend downward into the keg from the keg bung assembly 702. As shown in FIG. 7C, the valve assembly 712 of the device is open, allowing for a direct liquid path from the device into the keg through the keg valve assembly 703. Accordingly, since the device 710 may depress the liquid or ball valve and the ring valve of the keg, liquid may be poured directly into the keg and gas from the keg, displaced by the liquid, may be vented to the atmosphere.

Various embodiments of the invention provide a number of advantages. For example, the filling apparatus filling apparatus is easy to use, requiring little training and no other equipment or device. One person is able to use the filling apparatus effectively and easily, e.g., attach it to a keg and fill the keg with spirits using the filling apparatus. It is small enough to be transported easily and stored in a small space. It requires very little expertise to use effectively. The combination of the keg partially filled with a liquid, non-alcoholic pre-mix for a mixed drink, and the filling apparatus which can be easily used by a bartender or restaurant worker to add alcohol to the partially-filled keg in predetermined amounts, together enable a bar or restaurant to efficiently make and serve mixed drinks of consistently high quality on draft using standard, widely deployed coupling and serving equipment, such as the Sankey-D coupler and taps.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

Although some embodiments of the invention are illustrated and described herein as embodied in a hand-held pressure release and gravity filling funnel, it is not intended to be limited to the details shown because various modifications and structural changes may be made therein without departing from the spirit of the invention and within the scope and range of equivalents of the attributes described. Additionally, well-known elements of exemplary embodiments of the invention are not described in detail or omitted so as not to obscure the relevant details of the invention.

Further, it is to be understood that the terminology used herein is for the purpose of describing particular embodiments only and is not intended to be limiting. The terms "a" or "an" as used herein, are defined as one or more than one. The term "plurality" as used herein, is defined as two or more than two. The term "another" as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper," "lower," "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. The term "funnel axis" should be understood to mean in a direction corresponding to the funnel channel.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

What is claimed is:

1. A method of distributing mixed drinks comprising:
   providing a keg containing a non-alcoholic mix of liquids, wherein the mix is designed to be converted to a mixed drink by addition of alcohol; the quantity of mix in the keg is predetermined to allow for the addition of a predetermined quantity of the alcohol into the keg to complete the mixed drink; and the keg comprises a valve that is designed to connect to a coupler used to dispense beverages from the keg; and
   providing an apparatus to engage the keg and for pouring the alcohol into the keg, wherein the apparatus includes an upper hollow body connected to a lower body, the lower body comprising a valve assembly to regulate flow from the upper hollow body, a locking ring to lock the apparatus onto the keg, a probe to displace one or more portions of the valve, allowing gas to escape from the keg and allowing the alcohol to be poured into the keg through the upper hollow body and the lower body.

2. The method of claim 1, wherein the valve comprises a Sankey-D valve.

3. The method of claim 1, further comprising providing instructions to the end user regarding the process for installing the apparatus on the keg.

4. The method of claim 3, further comprising providing instructions to an end user regarding the amounts and types of alcohol to be added to the mix in the keg.

5. The method of claim 4, wherein the mix includes a liquid premix for a margarita.

6. The method of claim 1, wherein the keg comprises one of a recyclable material, plastic, an opaque material, or a clear material.

7. The method of claim 1, wherein: the quantity of mix is about two thirds of a capacity of the keg, and the quantity of the alcohol is about one third of the capacity of the keg.

8. The method of claim 1, wherein: a capacity of the keg is about 30 liters; and the quantity of the mix is about 21 liters.

9. A method of preparing mixed drinks comprising:
   receiving a keg containing a non-alcoholic mix of liquids, wherein (a) the mix is designed to be converted to a mixed drink by addition of alcohol; (b) the quantity of the mix in the keg is predetermined to allow for the addition of a predetermined quantity of the alcohol into the keg to complete the mixed drink; and (c) the keg comprises a valve designed to be connected to a coupler through which the mixed drink is dispensed; and
   using an apparatus to pour the alcohol into the keg, wherein the apparatus includes an upper hollow body connected to a lower body, the lower body comprising a valve assembly to regulate flow from the upper hollow body, a locking ring to lock the apparatus onto the keg, a probe to displace one or more portions of the valve, allowing gas to escape from the keg and allowing the alcohol to be poured into the keg through the upper hollow body and the lower body.

10. The method of claim 9, wherein the keg comprises a Sankey-D valve.

11. The method of claim 9, further comprising: mixing the mix with the alcohol to complete the mixed drink in the keg; connecting the keg to a Sankey-D coupler; and dispensing the mixed drink through a tap connected to the Sankey-D coupler.

12. The method of claim 9, wherein the apparatus includes an opening that is designed to enable a flow rate of one liter of the alcohol into the keg in about twenty seconds.

13. A system for distributing mixed drinks comprising:
   a keg containing a non-alcoholic mix of liquids, wherein (a) the mix is designed to be converted to a mixed drink by addition of alcohol; (b) the quantity of the mix in the keg is predetermined to allow for the addition of a predetermined quantity of the alcohol into the keg to complete the mixed drink; and (c) the keg comprises a valve designed to be connected to a coupler through which the mixed drink is dispensed; and
   an apparatus for pouring the alcohol into the keg, wherein the apparatus includes an upper hollow body connected to a lower body, the lower body comprising a valve assembly to regulate flow from the upper hollow body, a locking ring to lock the apparatus onto the keg, a probe to displace one or more portions of the valve, allowing gas to escape from the keg and allowing the alcohol to be poured into the keg through the upper hollow body and the lower body.

14. The system of claim 13, wherein the keg comprises a Sankey-D valve.

* * * * *